US012323177B2

(12) United States Patent
Van et al.

(10) Patent No.: US 12,323,177 B2
(45) Date of Patent: Jun. 3, 2025

(54) ELECTRONIC DEVICE FOR ADJUSTING RECEPTION GAIN OF RF SIGNAL BASED ON 2TX OPERATION AND CONTROL METHOD THEREOF

(71) Applicant: SAMSUNG ELECTRONICS CO., LTD., Suwon-si (KR)

(72) Inventors: Juho Van, Suwon-si (KR); Yongjun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 387 days.

(21) Appl. No.: 17/860,518

(22) Filed: Jul. 8, 2022

(65) Prior Publication Data

US 2023/0015730 A1    Jan. 19, 2023

Related U.S. Application Data

(63) Continuation of application No. PCT/KR2022/008777, filed on Jun. 21, 2022.

(30) Foreign Application Priority Data

Jul. 8, 2021    (KR) ........................ 10-2021-0089612

(51) Int. Cl.
H04B 1/12    (2006.01)
H04B 1/00    (2006.01)

(52) U.S. Cl.
CPC ........... *H04B 1/123* (2013.01); *H04B 1/0064* (2013.01)

(58) Field of Classification Search
CPC ...... H04B 1/005; H04B 1/006; H04B 1/0064; H04B 1/10; H04B 1/12; H04B 1/123;
(Continued)

(56) References Cited

U.S. PATENT DOCUMENTS 8,401,505 B1    3/2013  Bidichandani et al.
8,954,019 B2 *  2/2015  George ................ H04B 1/0057
                                                        455/130
(Continued)

FOREIGN PATENT DOCUMENTS

KR        10-0744952        8/2007
KR     10-2009-0005189      1/2009
(Continued)

OTHER PUBLICATIONS

Search Report and Written Opinion dated Sep. 20, 2022 issued in International Patent Application No. PCT/KR2022/008777.
(Continued)

*Primary Examiner* — Quochien B Vuong
(74) *Attorney, Agent, or Firm* — NIXON & VANDERHYE P.C.

(57) ABSTRACT

According to various embodiments, an electronic device may include: a radio frequency integrated circuit (RFIC) including a plurality of first low noise amplifiers (LNAs); at least one radio frequency front end (RFFE) operatively connected to the RFIC; and at least one communication processor operatively connected to the RFIC, wherein the at least one communication processor is configured to: based on a first RF signal within a first uplink band of a first operating band being output via the RFIC, control the RFIC to set, to be a first gain, a gain of at least one first LNA among the plurality of first LNAs configured to process a second RF signal within a first downlink band of the first operating band provided from the at least one RFFE to the RFIC, and based on the first RF signal and a third RF signal within a second uplink band of a second operating band different from the first operating band being at least concurrently output via the RFIC, control the RFIC to set, to be a second gain, the gain of the at least one first LNA configured to process the second RF signal provided from
(Continued)

the at least one RFFE to the RFIC, wherein the second gain is less than the first gain.

20 Claims, 14 Drawing Sheets

(58) Field of Classification Search
CPC ... H04B 1/01; H04B 1/38; H04B 1/40; H04B 1/401; H04B 1/50; H04B 1/54; H04B 1/56
See application file for complete search history.

(56) References Cited

U.S. PATENT DOCUMENTS

| | | | |
|---|---|---|---|
| 11,349,544 B2 * | 5/2022 | Chang | H04B 7/0608 |
| 2007/0010224 A1 | 1/2007 | Shi | |
| 2007/0262817 A1 | 11/2007 | Ciccarelli et al. | |
| 2008/0039045 A1 | 2/2008 | Filipovic et al. | |
| 2012/0184228 A1 | 7/2012 | Mujtaba et al. | |
| 2019/0081596 A1 | 3/2019 | Dunworth et al. | |
| 2020/0186400 A1 * | 6/2020 | Lee | H04B 1/0064 |
| 2020/0228300 A1 | 7/2020 | Lee et al. | |
| 2020/0403671 A1 | 12/2020 | Cho | |
| 2021/0092209 A1 | 3/2021 | Shinozaki et al. | |
| 2021/0242889 A1 | 8/2021 | Obiya et al. | |
| 2022/0361116 A1 | 11/2022 | Lee | |

FOREIGN PATENT DOCUMENTS

| | | | |
|---|---|---|---|
| KR | 10-2020-0037533 | 4/2020 | |
| KR | 20200037533 A * | 4/2020 | H04B 1/00 |
| KR | 10-2020-0071491 | 6/2020 | |
| KR | 10-2020-0088669 | 7/2020 | |
| KR | 10-2020-0144902 | 12/2020 | |
| KR | 10-2022-0053611 | 4/2022 | |
| WO | 20/138522 | 7/2020 | |

OTHER PUBLICATIONS

Extended European Search Report dated Nov. 4, 2024 for EP Application No. 22837855.0.

* cited by examiner

ELECTRONIC DEVICE FOR ADJUSTING RECEPTION GAIN OF RF SIGNAL BASED ON 2TX OPERATION AND CONTROL METHOD THEREOF

CROSS-REFERENCE TO RELATED APPLICATIONS

This application is a continuation of International Application No. PCT/KR2022/008777 designating the United States, filed on Jun. 21, 2022, in the Korean Intellectual Property Receiving Office and claiming priority to Korean Patent Application No. 10-2021-0089612, filed on Jul. 8, 2021, in the Korean Intellectual Property Office, the disclosures of which are incorporated by reference herein in their entireties.

BACKGROUND

Field

The disclosure relates to an electronic device for adjusting the reception gain of an RF signal, based on a 2-transmit (TX) operation, and a control method thereof.

Description of Related Art

With the use of portable terminals having various functions becoming prevalent through the recent development of mobile communication technology, efforts to develop a 5G communication system have been made in order to meet increasing wireless data traffic demands. In order for the 5G communication system to provide a faster data transfer speed to accomplish a high data transfer rate, it has been considered that the system is implemented in a higher frequency operating band (e.g., a band above 6 GHz) in addition to an operating band (i.e., a frequency band (e.g., a band of 6 GHz or below) used in 3G communication systems and long term evolution (LTE) communication systems.

An electronic device may support E-UTRA new radio dual connectivity (EN-DC) using both an LTE communication system and a 5G communication system in order to provide a faster data transfer speed. When the electronic device operates according to EN-DC, a 2TX operation of transmitting RF signals within multiple operating bands (e.g., an evolved universal terrestrial radio access (E-UTRA) operating band and a new radio (NR) operating band) may be performed. In the process of transmitting RF signals within multiple operating bands, an intermodulation distortion (IMD) (hereinafter, IMD) may occur in at least one communication element (e.g., a radio frequency front end (RFFE)) included in the electronic device. If this IMD component is included in a downlink band, RX performance degradation (e.g., desense) for a received RF signal may occur.

The electronic device may also support carrier aggregation (CA) (e.g., uplink carrier aggregation (ULCA)) using an LTE communication system in multiple operating bands, in order to provide a faster data transfer speed. When the electronic device operates according to CA (e.g., ULCA), a 2TX operation of transmitting RF signals within multiple operating bands may be performed. Also in this case, an IMD may occur in at least one communication element (e.g., an RFIC (i.e., a transceiver) and/or an RFFE), and RX performance degradation (e.g., desense) for a received RF signal may occur.

The electronic device may also support, other than EN-DC described above, new radio E-UTRA dual connectivity (NE-DC), multi-RAT dual connectivity (MR-DC), and/or new radio dual connectivity (NR-DC) using two or more radio access technologies (RATs), and also in this case, an IMD may occur in at least one communication element (e.g., an RFIC and/or an RFFE), and RX performance degradation (e.g., desense) for a received RF signal may occur.

SUMMARY

Various embodiments may provide an electronic device for adjusting, at the time of a 2TX operation, the gain of at least one amplification element (e.g., a low noise amplifier (LNA)) included in at least one communication element (e.g., an RFIC and/or an RFFE), and a control method thereof.

According to various embodiments, an electronic device may include: a radio frequency integrated circuit (RFIC) including a plurality of first low noise amplifiers (LNAs); at least one radio frequency front end (RFFE) operatively connected to the RFIC; and at least one communication processor operatively connected to the RFIC, wherein the at least one communication processor is configured to: based on a first RF signal within a first uplink band of a first operating band being output via the RFIC, control the RFIC to set, to be a first gain, a gain of at least one first LNA among the plurality of first LNAs configured to process a second RF signal within a first downlink band of the first operating band provided from the at least one RFFE to the RFIC, and based on the first RF signal and a third RF signal within a second uplink band of a second operating band different from the first operating band being at least concurrently output via the RFIC, control the RFIC to set, to be a second gain, the gain of the at least one first LNA configured to process the second RF signal provided from the at least one RFFE to the RFIC, and wherein the second gain is less than the first gain.

According to various embodiments, a method for controlling an electronic device may include: based on a first RF signal within a first uplink band of a first operating band being output via a radio frequency integrated circuit (RFIC) of the electronic device, controlling the RFIC to set, to be a first gain, a gain of at least one first low noise amplifier (LNA) among a plurality of first LNAs included in the RFIC to process a second RF signal within a first downlink band of the first operating band provided from a radio frequency front end (RFFE) of the electronic device to the RFIC; and based on the first RF signal and a third RF signal within a second uplink band of a second operating band different from the first operating band being at least concurrently output via the RFIC, controlling the RFIC to set, to be a second gain, the gain of the at least one first LNA configured to process the second RF signal provided from the at least one RFFE to the RFIC, wherein the second gain is less than the first gain.

According to various embodiments, a non-transitory computer-readable recording medium may store instructions which, when executed, cause at least one communication processor of an electronic device to, based on a first RF signal within a first uplink band of a first operating band being output via a radio frequency integrated circuit (RFIC) of the electronic device, control the RFIC to set, to be a first gain, a gain of at least one first low noise amplifier (LNA) among a plurality of first LNAs included in the RFIC to process a second RF signal within a first downlink band of the first operating band provided from a radio frequency front end (RFFE) of the electronic device to the RFIC, and based on the first RF signal and a third RF signal within a second uplink band of a second operating band different from the first operating band being at least concurrently output via the RFIC, control the RFIC to set, to be a second gain, the gain of the at least one first LNA configured to process the second RF signal provided from the at least one RFFE to the RFIC, and wherein the second gain is less than the first gain.

According to various embodiments, an electronic device can alleviate RX performance degradation (e.g., desense) for a received RF signal by adjusting, at the time of a 2TX operation, the gain of at least one amplification element (e.g., a LNA)) included in at least one communication element (e.g., an RFIC and/or an RFFE).

Various effects of the disclosure are not limited to the above effect.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
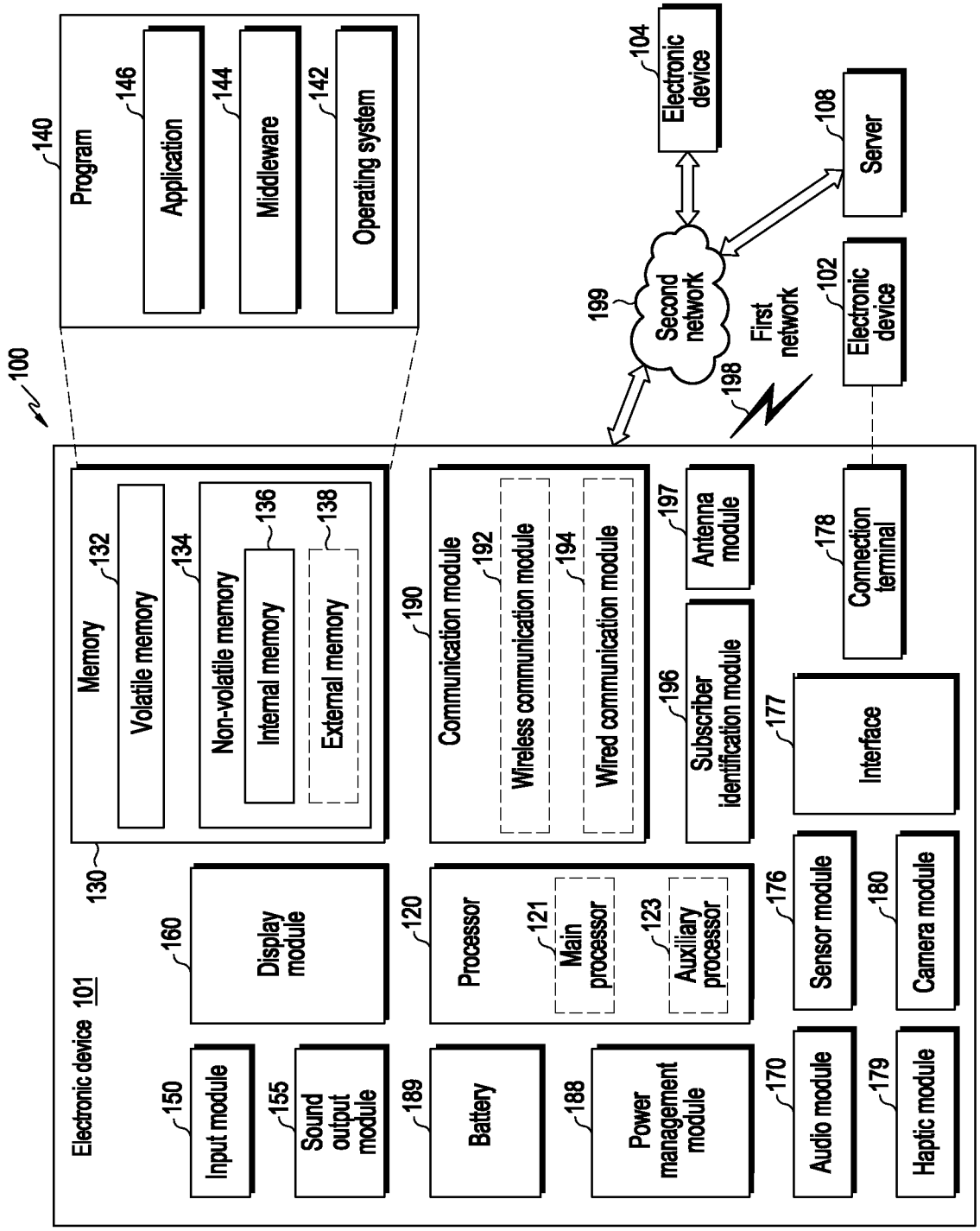
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
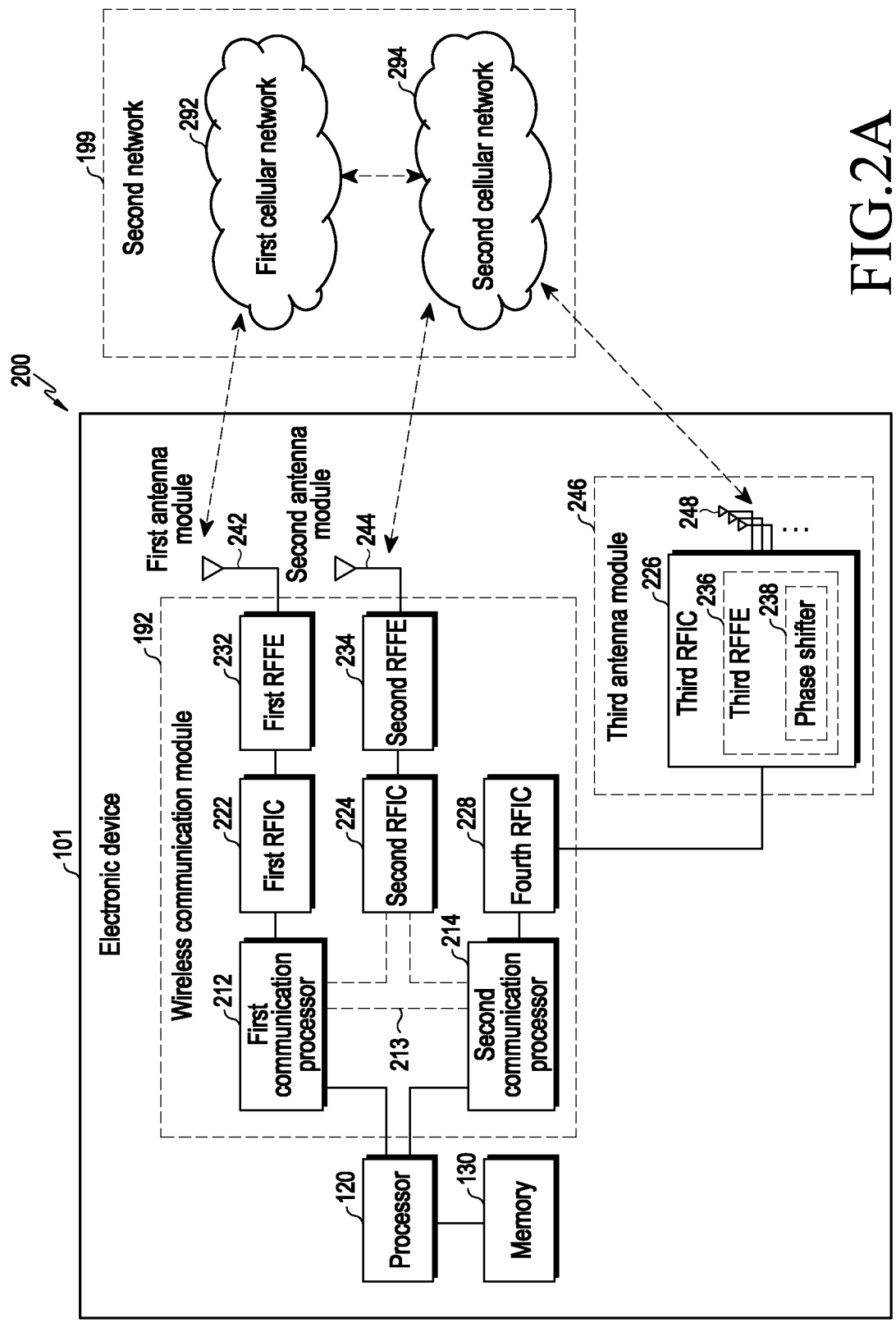
FIG. 2A is a block diagram of an electronic device for supporting legacy network communication and 5G network communication according to various embodiments.
Figure 2B:
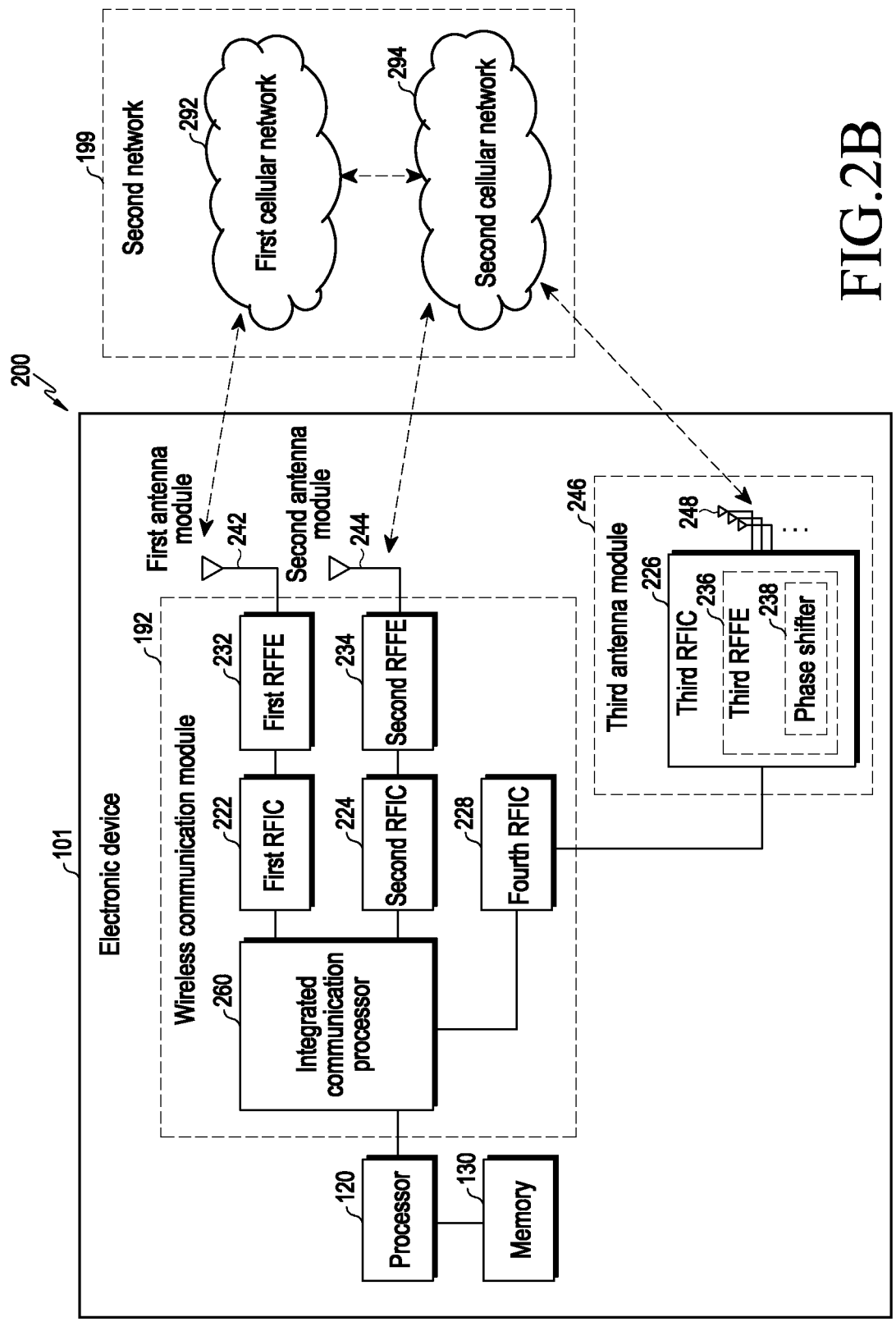
FIG. 2B is a block diagram of an electronic device for supporting legacy network communication and 5G network communication according to various embodiments.

FIG. 2A is a block diagram 200a of the electronic device 101 for supporting legacy network communication and 5G network communication according to various embodiments. FIG. 2B is a block diagram 200b of the electronic device 101 for supporting legacy network communication and 5G network communication according to various embodiments.

Referring to FIG. 2A, the electronic device 101 may include a first communication processor (e.g., including processing circuitry) 212, a second communication processor (e.g., including processing circuitry) 214, a first RFIC 222, a second RFIC 224, a third RFIC 226, a fourth RFIC 228, a first RFFE 232, a second RFFE 234, a first antenna module 242, a second antenna module 244, and/or an antenna 248. The electronic device 101 may further include a processor (e.g., including processing circuitry) 120 and a memory 130. A second network 199 may include a first cellular network 292 and a second cellular network 294. According to an embodiment, the electronic device 101 may further include at least one component among the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted, or may be included as a part of the third RFIC 226.

The first communication processor 212 may include various processing circuitry and establish a communication channel within a band to be used for wireless communication with the first cellular network 292, and may support legacy network communication performed through the established communication channel. According to various embodiments, the first cellular network 292 may be a legacy network including a second generation second generation (2G), 3G, 4G, or LTE network. The second communication processor 214 may include various processing circuitry and establish a communication channel corresponding to a designated band (e.g., about 6 GHz-60 GHz) among bands to be used for wireless communication with the second cellular network 294, and may support 5G network communication performed through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or lower) among bands to be used for wireless communication with the second cellular network 294, and may support 5G network communication performed through the established communication channel.

The first communication processor 212 may transmit or receive data to or from the second communication processor 214. For example, data which has been classified to be transmitted through the second cellular network 294 may be changed to be transmitted through the first cellular network 292. In this case, the first communication processor 212 may receive transmission data from the second communication processor 214. For example, the first communication processor 212 may transmit or receive data to or from the second communication processor 214 via an interprocessor interface 213. The interprocessor interface 213 may be implemented as, for example, a universal asynchronous receiver/transmitter (UART) (e.g., a high speed-UART (HS-UART) or peripheral component interconnect bus express (PCIe) interface), but the type thereof is not limited. Alternatively, the first communication processor 212 and the second communication processor 214 may exchange control information and packet data information using, for example, a shared memory. The first communication processor 212 may transmit or receive, to or from the second communication processor 214, various information, such as sensing information, information on output strength, and resource block (RB) allocation information.

According to implementation, the first communication processor 212 may not be directly connected to the second communication processor 214. In this case, the first communication processor 212 may transmit or receive data to or from the second communication processor 214 via the processor 120 (e.g., an application processor). For example, the first communication processor 212 and the second communication processor 214 may transmit or receive data to or from each other via the processor 120 (e.g., an application processor (AP)) and an HS-UART interface or a PCIe interface, but the type of the interface is not limited. Alternatively, the first communication processor 212 and the second communication processor 214 may exchange control information and packet data information using the processor 120 (e.g., an AP) and a shared memory.

According to an embodiment, the first communication processor 212 and the second communication processor 214 may be implemented as a single chip or in a single package. According to various embodiments, the first communication processor 212 or the second communication processor 214 may be configured as a single chip or in a single package together with the processor 120 (e.g., the main processor 121), the auxiliary processor 123, or the communication module 190. For example, as illustrated in FIG. 2B, an integrated communication processor 260 may include various processing circuitry and support both a function for communication with the first cellular network 292 and a function for communication with the second cellular network 294.

According to an embodiment, the wireless communication module 192 may further include a memory (not illustrated) (e.g., a random access memory (RAM). The electronic device 101 may, when booted (e.g., after booted), update information stored in the processor 120 (e.g., an application processor) in the memory (not illustrated) (e.g., RAM) of the wireless communication module 192. For example, the information updated in the memory (not illustrated) of the wireless communication module 192 may include information used when at least one communication processor (e.g., the first communication processor 212, the second communication processor 214, and/or the integrated communication processor 260) controls at least one RFIC 222, 224, and 228, and/or at least one RFFE 232 and 234. For example, the information updated in the memory (not illustrated) of the wireless communication module 192 may include information (e.g., a look-up table) on the gain (or a gain mode) of at least one RFIC 222, 224, and 228, and/or at least one RFFE 232 and 234.

The first RFIC 222 may convert, at the time of transmission, a baseband signal generated by the first communication processor 212 into a radio frequency (RF) signal having a frequency of about 700 MHz to about 3 GHz, which is used in the first cellular network 292 (e.g., a legacy network). At the time of reception, an RF signal may be obtained from the first cellular network 292 (e.g., a legacy network) through an antenna (e.g., the first antenna module 242), and may be preprocessed via an RFFE (e.g., the first RFFE 232). The first RFIC 222 may convert a preprocessed RF signal into a baseband signal so as to enable the preprocessed RF signal to be processed by the first communication processor 212.

The second RFIC 224 may convert, at the time of transmission, a baseband signal generated by the first communication processor 212 or the second communication processor 214 into a RF signal (hereinafter, a 5G Sub6 RF signal) within a Sub6 band (e.g., about 6 GHz or lower) used in the second cellular network 294 (e.g., a 5G network). At the time of reception, a 5G Sub6 RF signal may be obtained from the second cellular network 294 (e.g., a 5G network) through an antenna (e.g., the second antenna module 244), and may be preprocessed via an RFFE (e.g., the second RFFE 234). The second RFIC 224 may convert a preprocessed 5G Sub6 RF signal into a baseband signal so as to enable the preprocessed 5G Sub6 RF signal to be processed by a corresponding communication processor among the first communication processor 212 or the second communication processor 214.

The third RFIC 226 may convert a baseband signal generated by the second communication processor 214 into a RF signal (hereinafter, a 5G Above6 RF signal) within a 5G Above6 band (e.g., about 6 GHz-about 60 GHz) to be used in the second cellular network 294 (e.g., a 5G network). At the time of reception, a 5G Above6 RF signal may be obtained from the second cellular network 294 (e.g., a 5G network) through an antenna (e.g., the antenna 248), and may be preprocessed via a third RFFE 236. The third RFIC 226 may convert a preprocessed 5G Above6 RF signal into a baseband signal so as to enable the preprocessed 5G Above6 RF signal to be processed by the second communication processor 214. According to an embodiment, the third RFFE 236 may be configured as a part of the third RFIC 226.

According to an embodiment, the electronic device 101 may include the fourth RFIC 228 separately from or at least a part of the third RFIC 226. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second cellular network 294 (e.g., a 5G network) through an antenna (e.g., the antenna 248), and may be converted into an IF signal by the third RFFE 226. The fourth RFIC 228 may convert an IF signal into a baseband signal so as to enable the IF signal to be processed by the second communication processor 214.

According to an embodiment, the first RFIC 222 and the second RFIC 224 may be implemented as at least a part of a single chip or a single package. According to various embodiments, as illustrated in FIG. 2A or FIG. 2B, when the first RFIC 222 and the second RFIC 224 are implemented as a single chip or a single package, the second RFIC 224 may be omitted. In this case, the first RFIC 222 may be connected to the first RFFE 232 and the second RFFE 234 and convert a baseband signal into a signal within a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with another antenna module so as to process RF signals within multiple corresponding bands.

According to an embodiment, the third RFIC 226 and the antenna 248 may be arranged on the same substrate so as to configure a third antenna module 246. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), so as to configure the third antenna module 246. The length of a transmission line between the third RFIC 226 and the antenna 248 can be reduced by arranging the third RFIC and the antenna on the same substrate. Therefore, for example, loss (e.g., attenuation) of, by a transmission line, a signal within a high frequency band (e.g., about 6 GHz-about 60 GHz) used for 5G network communication can be reduced. Accordingly, the electronic device 101 can improve the quality or speed of communication with the second cellular network 294 (e.g., a cellular 5G network).

According to an embodiment, the antenna 248 may be configured to be an antenna array including multiple antenna elements which are usable for beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station (BS) of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This process enables transmission or reception through beamforming between the electronic device 101 and the outside.

The second cellular network 294 (e.g., a 5G network) may be operated independently to the first cellular network 292 (e.g., a legacy network) (e.g., stand-alone (SA), or may be operated while being connected thereto (e.g., non-stand-alone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access a access network of a 5G network, and then access an external network (e.g., Internet) under the control of a core network (e.g., an evolved packed core (EPC)) of a legacy network. Protocol information (e.g., LTE protocol information) for communication with a legacy network or protocol information (e.g., NR protocol information) for communication with a 5G network may be stored in the memory 230, and may be accessed by another component (e.g., the processor 120, the first communication processor 212, and/or the second communication processor 214).

Figure 3A:
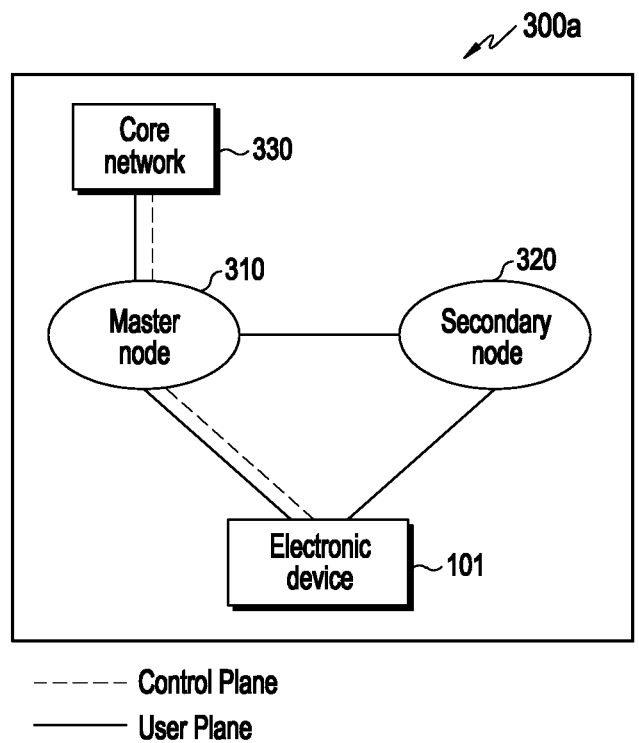
FIG. 3A is a diagram illustrating wireless communication systems providing legacy network communication and/or 5G network communication according to various embodiments.
Figure 3B:
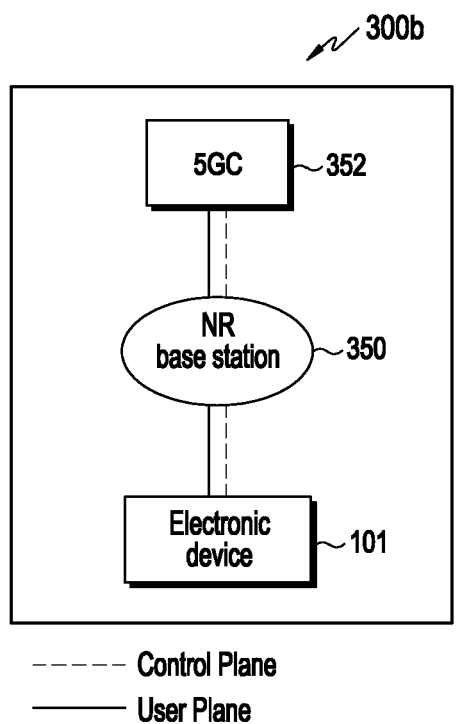
FIG. 3B is a diagram illustrating wireless communication systems providing legacy network communication and/or 5G network communication according to various embodiments.
Figure 3C:
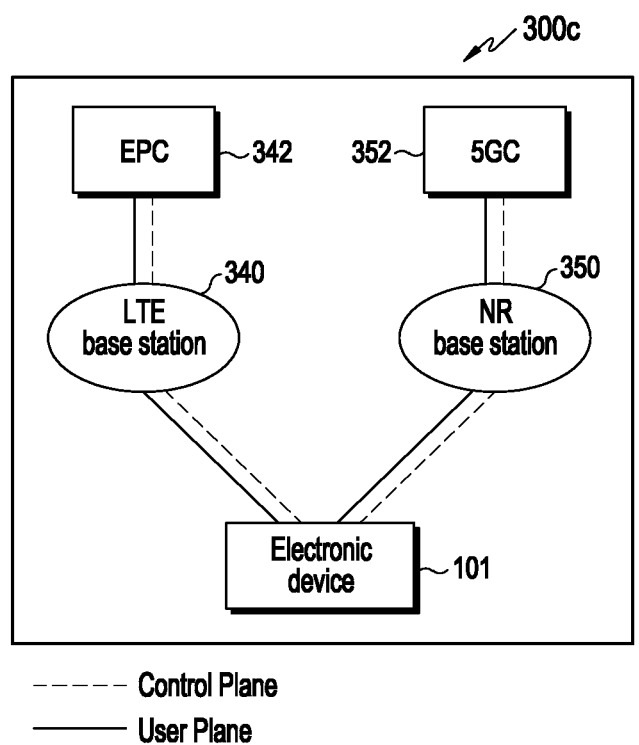
FIG. 3C is a diagram illustrating wireless communication systems providing legacy network communication and/or 5G network communication according to various embodiments.

FIG. 3A is a diagram illustrating wireless communication systems providing legacy network communication and/or 5G network communication according to various embodiments. FIG. 3B is a diagram illustrating wireless communication systems providing legacy network communication and/or 5G network communication according to various embodiments. FIG. 3C is a diagram illustrating wireless communication systems providing legacy network communication and/or 5G network communication according to various embodiments.

Referring to FIGS. 3A, 3B, and 3C, each of network environments 300a to 300c may include at least one of a legacy network and a 5G network. The legacy network may include, for example, a 3GPP standard LTE (or 4G) base station 340 (e.g., an eNodeB (eNB)) which supports wireless access with the electronic device 101, and an evolved packet core (EPC) 342 which manages 4G communication. The 5G network may include, for example, a new radio (NR) base station 350 (e.g., a gNB (gNodeB)) which supports wireless access with the electronic device 101, and a 5th generation core (5GC) 352 which manages 5G communication of the electronic device 101.

According to various embodiments, the electronic device 101 may transmit or receive a control message and user data through legacy communication and/or 5G communication. The control message may include, for example, a message related to at least one of security control, bearer setup, authentication, registration, or mobility management of the electronic device 101. The user data may indicate, for example, user data except for a control message which is transmitted or received between the electronic device 101 and a core network 330 (e.g., the EPC 342).

Referring to FIG. 3A, the electronic device 101 according to an embodiment may transmit or receive at least one of a control message or user data to or from at least a part (e.g., the NR base station 350 and/or the 5GC 352) of the 5G network using at least a part (e.g., the LTE base station 340 and/or the EPC 342) of the legacy network.

According to various embodiments, the network environment 300a may include a network environment which provides wireless communication dual connectivity (DC) to the LTE base station 340 and the NR base station 350, and enables transmission or reception of a control message to or from the electronic device 101 through one core network 330 among the EPC 342 or the 5GC 352.

According to various embodiments, in a dual connectivity (DC) environment, one base station among the LTE base station 340 or the NR base station 350 may operate as a master node 310, and the other one may operate as a secondary node (SN) 320. The MN 310 may be connected to the core network 330 so as to transmit or receive a control message thereto or therefrom. The MN 310 and the SN 320 may be connected to each other through a network interface so as to transmit or receive a message related to management of a wireless resource (e.g., a communication channel) to or from each other.

According to various embodiments, the MN 310 may be configured by the LTE base station 340, the SN 320 may be configured by the NR base station 350, and the core network 330 may be configured by the EPC 342. For example, a control message may be transmitted or received via the LTE base station 340 and the EPC 342, and user data may be transmitted or received via at least one of the LTE base station 340 or the NR base station 350.

According to various embodiments, the MN 310 may be configured by the NR base station 350, the SN 320 may be configured by the LTE base station 340, and the core network 330 may be configured by the 5GC 352. For example, a control message may be transmitted or received via the NR base station 350 and the 5GC 352, and user data may be transmitted or received via at least one of the LTE base station 340 or the NR base station 350.

Referring to FIG. 3B, according to various embodiments, the 5G network may be configured by the NR base station 350 and the 5GC 352, and may transmit or receive a control message and user data independently to the electronic device 101.

Referring to FIG. 3C, the legacy network and the 5G network according to various embodiments may independently provide data transmission or reception. For example, the electronic device 101 and the EPC 342 may transmit or receive a control message and user data to or from each other through the LTE base station 340. As another example, the electronic device 101 and the 5GC 352 may transmit or receive a control message and user data to or from each other through the NR base station 350.

According to various embodiments, the electronic device 101 may be registered in at least one of the EPC 342 or the 5GC 352 so as to transmit or receive a control message thereto or therefrom.

According to various embodiments, the EPC 342 or the 5GC 352 may interwork with each other to manage communication of the electronic device 101. For example, movement information of the electronic device 101 may be transmitted or received via an interface between the EPC 342 and the 5GC 352.

As described above, dual connectivity accomplished by the LTE base station 340 and the NR base station 350 may also be named as EN-DC.

With reference to the drawings described below, operations according to various embodiments will be described. Embodiments will described below under a precondition of a EN-DC network connection in which the LTE base station 340 is the MN 310, the NR base station 350 is the SN 320, and the electronic device 101 is connected to the first cellular network 292 (e.g., a legacy network) and the second cellular network 294 (e.g., a 5G network). However, the embodiments described below may also be applied to a case where the electronic device 101 supports various types of dual connectivity (DC) (e.g., NE-DC and/or MR-DC). In this case, in the embodiments described below, "a first network" and "a second network" may indicate the first cellular network 292 and the second cellular network 294. In addition, the embodiments described below may also be applied to a case where the electronic device 101 supports connectivity (e.g., carrier aggregation (CA)) using one RAT rather than dual connectivity using two or more RATs. In this case, in the embodiments described below, "a first network" and "a second network" may indicate the first cellular network 292.

Figure 4:
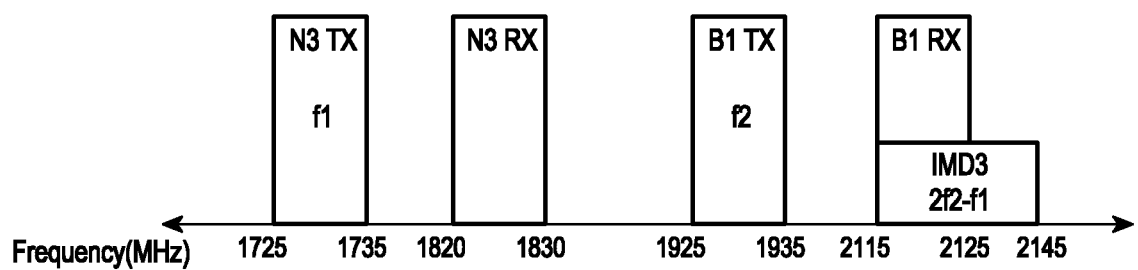
FIG. 4 is a diagram illustrating examples in which an IMD occurs according to various embodiments.

FIG. 4 is a diagram illustrating examples in which an IMD occurs according to various embodiments.

According to various embodiments, an electronic device (e.g., the electronic device 101 in FIG. 1) may be connected to a first cellular network (e.g., the first cellular network 292 in FIG. 2A and/or FIG. 2B) and a second cellular network (e.g., the second cellular network 294 in FIG. 2A and/or FIG. 2B). According to various embodiments, the electronic device 101 may transmit and/or receive RF signals within a first operating band corresponding to the first cellular network 292, and transmit and/or receive RF signals within a second operating band which is different from the first operating band and corresponds to the second cellular network 294.

Referring to FIG. 4, an example in which the first operating band is B1 of an LTE communication network (or an RAT of E-UTRA) and the second operating band is N3 of a 5G communication network (or an RAT of NR) is illustrated. The first operating band (B1) may include a first uplink band (e.g., an uplink band (B1 TX) having a frequency band of 1925 to 1935 Hz) and a first downlink band (e.g., a downlink band (B1 RX) having a frequency band of 2115 to 2125 Hz). The second operating band (N3) may include a second uplink band (e.g., an uplink band (N3 TX) having a frequency band of 1725 to 1735 Hz) and a second downlink band (e.g., a downlink band (N3 RX) having a frequency band of 1820 to 1830 Hz).

According to various embodiments, the electronic device 101 may operate in 2TX to at least concurrently generate and/or transmit (e.g., apply RF signals to an antenna) RF signals within multiple operating bands (e.g., the first uplink band and the second uplink band). In this process, an IMD component may be generated by an RF signal within the first uplink band and an RF signal within the second uplink band, and the generated IMD component (e.g., a third-order IMD (IMD3)) may affect at least one downlink band of the electronic device 101. For example, the frequency of the generated IMD component (e.g., IMD3) may be represented by 2f1−f2 and/or 2f2−f1, based on at least one frequency (f1) (hereinafter, at least one first frequency) within the first uplink band and at least one frequency (f2) (hereinafter, at least one second frequency) within the second uplink band. If, as illustrated, the frequency (e.g., 2f1−f2 and/or 2f2−f1) of the generated IMD component (e.g., IMD3) is included in a frequency range of the first downlink band and/or the second downlink band, RX performance degradation (e.g., desense) for an RF signal within the first downlink band and/or the second downlink band, which is received by the electronic device 101) may occur.

In FIG. 4, a case where the first operating band and the second operating band are B1 and N3 is illustrated as an example. However, the same or similar description may also be applied to operating bands wherein at least one frequency within multiple uplink bands is included in at least one downlink band. Moreover, in FIG. 4, an example for MR-DC related to a E-UTRA band and an NR band is described. However, as described above, a person skilled in the art would understand that the same or similar description may also be applied to bands corresponding to multiple component carriers (CCs) according to CA in one RAT.

Figure 5:
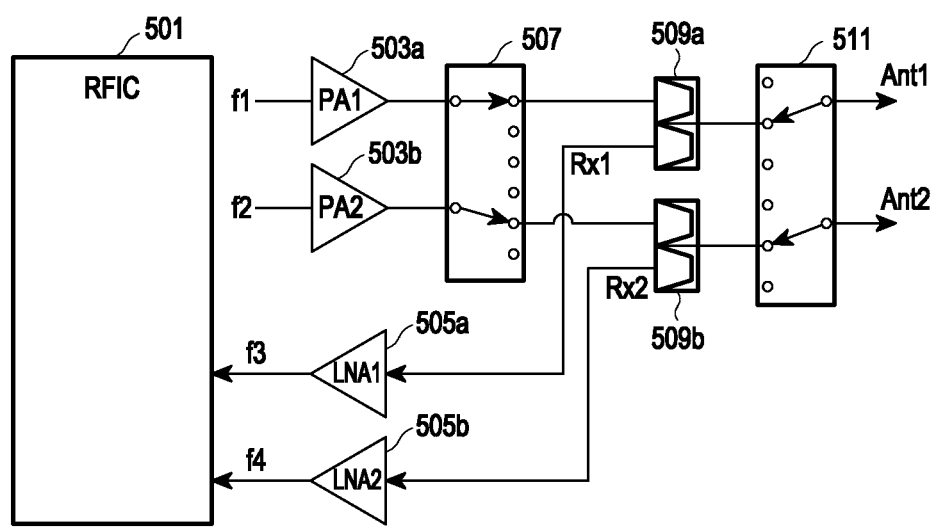
FIG. 5 is a block diagram illustrating communication elements of an electronic device according to various embodiments.

FIG. 5 is a block diagram illustrating communication elements of the electronic device 101 according to various embodiments. Hereinafter, the description will be given with reference to FIG. 2A and/or FIG. 2B together.

According to various embodiments, the electronic device 101 may include an RFIC 501 (e.g., the first RFIC 222 and/or the second RFIC 224 in FIG. 2A and/or FIG. 2B), a first power amplifier (PA) 503a, a second PA 503b, a first LNA 505a, a second LNA 505b, a first switch 507 (e.g., a PA band selection switch), a first filter 509a, a second filter 509b, and/or a second switch 511 (e.g., an antenna switch).

According to various embodiments, the RFIC 501 may include the first RFIC 222 operatively connected to the first PA 503a and the first communication processor 212 (or the integrated communication processor 260), and the second RFIC 224 operatively connected to the second PA 503b and the second communication processor 214 (or the integrated communication processor 260). According to various embodiments, the RFIC 501 may include at least one amplification element (e.g., a PA and/or an LNA), and the elements included in the RFIC 501 will be described in detail with reference to the drawings described below. According to various embodiments, the first PA 503a, the first LNA 505a, and the first filter 509a may configure the first RFFE 232, and the second PA 503b, the second LNA 505b, and the second filter 509b may configure the second RFFE 234. As described above, various embodiments may also be applied to CA as well as MR-DC, and in this case, the first PA 503a, the first LNA 505a, the first filter 509a, the second PA 503b, the second LNA 505b, and the second filter 509b may be implemented by at least one RFFE for one RAT. The at least one RFFE may be configured in a type of a power amplifier module (PAM), a front end module (FEM), a power amplifier module including duplexer (PAMiD), a LNA and PAM with integrated duplexer or diplexer (LPAMID) and/or a PA with integrated low noise amplifier and filter (LPAMIF), and the implementation type thereof is not limited thereto.

According to various embodiments, the RFIC 501 may convert, at the time of transmission, a baseband signal generated by at least one communication processor (e.g., the first communication processor 212, the second communication processor 214, and/or the integrated communication processor 260) into a radio frequency (RF) signal used in a first network (e.g., the first cellular network 292) or a second network (e.g., the second cellular network 294). For example, the RFIC 501 (e.g., the first RFIC 222) may provide an RF signal used in the first network to the first RFFE 232 (e.g., the first PA 503a). The RFIC 501 (e.g., the second RFIC 224) may provide an RF signal used in the second network to the second RFFE 234 (e.g., the second PA 503b). According to various embodiments, the RFIC 501 may, at the time of reception, convert an RF signal received from at least one RFFE (e.g., the first RFFE 232 or the second RFFE 234) into a baseband signal, and provide the baseband signal to the at least one communication processor (e.g., the first communication processor 212, the second communication processor 214, and/or the integrated communication processor 260).

According to various embodiments, the first PA 503a and the second PA 503b may amplify an RF signal (e.g., an RF signal within an uplink band) input from the RFIC 501, and output the amplified signal to the first switch 507.

According to various embodiments, the first filter 509a and the second filter 509b may filter, within a frequency band having a designated range, an RF signal (e.g., an RF signal within an uplink band) input through the first switch 507. According to various embodiments, an RF signal filtered by the first filter 509a and the second filter 509b may be output to the outside through at least one antenna (Ant 1 and/or Ant 2)(e.g., the first antenna module 242 and/or the second antenna module 244). According to various embodiments, the first filter 509a and the second filter 509b may filter, within a frequency band having a designated range, an RF signal (e.g., an RF signal within a downlink band) input through the second switch 511. According to various embodiments, an RF signal filtered by the first filter 509a and the second filter 509b may be input to at least one LNA (e.g., the first LNA 505a and/or the second LNA 505b).

According to various embodiments, the first LNA 505a and the second LNA 505b may amplify an RF signal (e.g., an RF signal within a downlink band) input from at least one filter (e.g., the first filter 509a and the second filter 509b) and output the amplified signal to the RFIC 501.

Referring to FIG. 5, an IMD component may be generated in at least one of the above communication elements by RF signals generated by the RFIC 501. For example, the RFIC 501 may provide, to the first PA 503a and the second PA 503b, a first RF signal having f1 frequency and a second RF signal having f2 frequency. The first RF signal input to the first PA 503a is induced to an input path of the second PA 503b, or the second RF signal input to the second PA 503b is induced to an input path of the first PA 503a, so that an IMD component may be generated in the first PA 503a and/or the second PA 503b. For example, the first RF signal amplified by the first PA 503a is induced to an input path of the second PA 503b, or the second RF signal amplified by the second PA 503b is induced to an input path of the first PA 503a, so that an IMD component may be generated in the first PA 503a and/or the second PA 503b. For example, the first RF signal amplified by the first PA 503a is induced to a path connected to the second PA 503b and the first switch 507, or the second RF signal amplified by the second PA 503b is induced to a path connected to the first PA 503a and the first switch 507, so that an IMD component may be generated in the first switch 507. For example, the first RF signal input to the first PA 509a through the first switch 507 is induced to an input path of the second filter 509b, or the second RF signal input to the second filter 509b through the first switch 507 is induced to an input path of the first filter 509a, so that an IMD component may be generated in the first filter 509a and/or the second filter 509b. For example, the first RF signal input to the second switch 511 through the first filter 509a is induced to a path connected to the second filter 509b and the second switch 511, or the second RF signal input to the second switch 511 through the second filter 509b is induced to a path connected to the first filter 509a and the second switch 511, so that an IMD component may be generated in the second switch 511. For example, the first RF signal input to a first antenna (Ant 1) (e.g., the first antenna module 242) through the second switch 511 is induced to a second antenna (Ant 2) (e.g., the second antenna module 244), or the second RF signal input to the second antenna (Ant 2) (e.g., the second antenna module 244) through the second switch 511 is induced to the first antenna (Ant 1) (e.g., the first antenna module 242), so that an IMD component may be generated in the first antenna (Ant 1) and/or the second antenna (Ant 2). For example, the first RF signal and/or the second RF signal is induced to an input path of the first LNA 505a and/or the second LNA 505b, so that an IMD component may be generated in the first LNA 505a and/or the second LNA 505b by the induced RF signal and an RF signal (e.g., a third RF signal having f3 frequency and/or a fourth RF signal having f4 frequency) received from the outside through the first antenna (Ant 1) and/or the second antenna (Ant 2). For example, an RF signal output from one of the first LNA 505a and/or the second LNA 505b is induced to an input path and/or an output path of the other LNA, so that an IMD component may be generated in the first LNA 505a, the second LNA 505b, and/or the RFIC 501.

If the above IMD components are included in a downlink band of the electronic device 101, RX performance degradation (e.g., desense) for an RF signal received from the outside may occur. For example, in a case when an isolation (e.g., DPX isolation) characteristic of the first and second filters 509a and 509b is 60 dB, IIP3 characteristic of the RFIC 501 is 0 dBm, IIP3 characteristic of the first and second LNAs 505a and 505b is −5 dBm, the gain of the first and second LNAs 505a and 505b is 19 dB, and a default sensitivity is −100 dBm, when the above IMD components are generated, sensitivity is −86 dBM, and thus a desense of 14 dB may occur. If the first and second filters 509a and 509b can be implemented to have an isolation characteristic of 60 dB or higher, desense may decrease, but the implementable isolation characteristic has a limit, and it may be difficult to ensure the same for all RX frequencies.

Figure 6A:
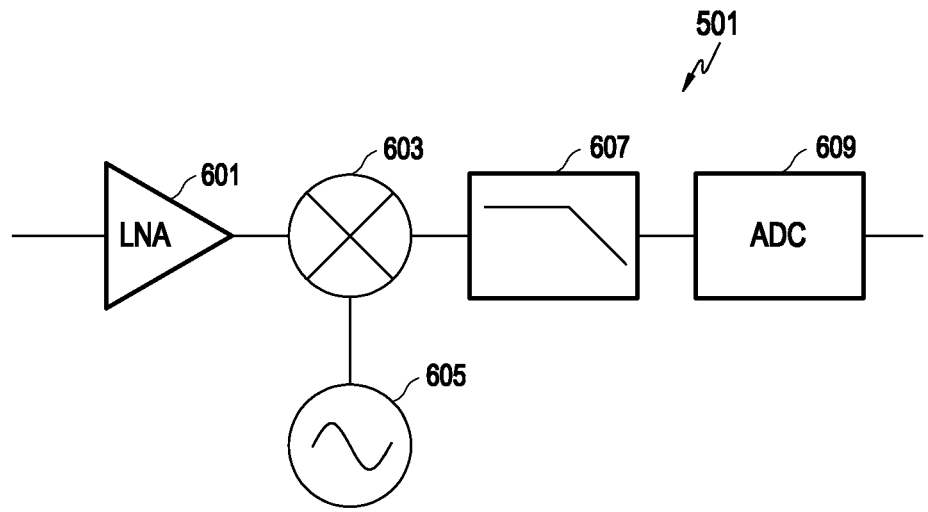
FIG. 6A is a block diagram illustrating elements of an RFIC according to various embodiments.
Figure 6B:
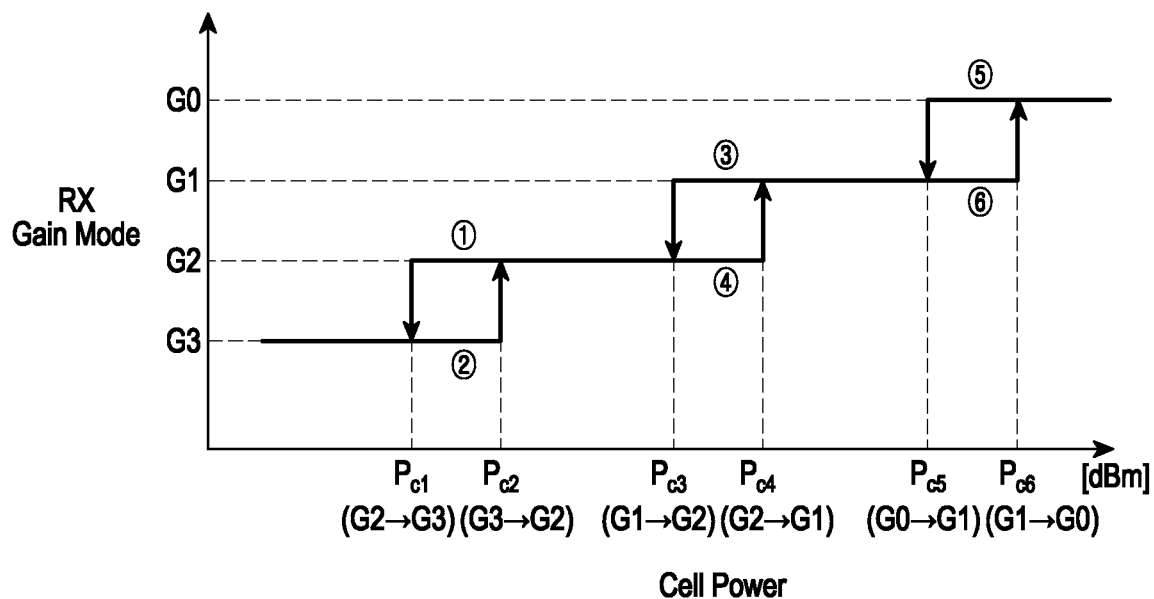
FIG. 6B is a diagram illustrating a method for controlling the LNA gain of an RFIC by an electronic device according to various embodiments.

FIG. 6A is a block diagram illustrating elements of the RFIC 501 according to various embodiments. FIG. 6B is a diagram illustrating a method for controlling the LNA gain of the RFIC 501 by an electronic device (e.g., the electronic device 101 in FIG. 1) according to various embodiments. Hereinafter, the description will be given with reference to FIG. 2A, FIG. 2B, and/or FIG. 5 together.

Referring to FIG. 6A, according to various embodiments, the RFIC 501 may include an LNA 601, a mixer 603, a voltage controlled oscillator (VCO) 605, a baseband filter 607, and/or an analog-digital converter (ADC) 607. According to various embodiments, the LNA 601, the mixer 603, the voltage controlled oscillator (VCO) 605, the baseband filter 607, and/or the analog-digital converter (ADC) 607 may be included in each of the first RFIC 222 and the RFIC 224.

According to various embodiments, the LNA 601 may amplify RF signals input from an LNA (e.g., the first LNA 505a or the second LNA 505b) of an RFFE (e.g., the first RFFE 232 or the second RFFE 234), and output the amplified signals to the mixer 603. According to various embodiments, the mixer 603 may convert an RF signal input from the LNA 601 into a baseband signal, based on the frequency of a signal input from the VCO 605. According to various embodiments, the baseband filter 607 may filter a baseband signal converted by the mixer 603 within a frequency band (e.g., a band having a designated frequency or lower) having a designated range. According to various embodiments, the ADC 609 may convert a baseband signal filtered by the baseband filter 607 into a digital signal, and provide the digital signal to at least one communication processor (e.g., the first communication processor 212, the second communication processor 214, and/or the integrated communication processor 260).

According to various embodiments, the gain of the LNA 601 may be controlled by the at least one communication processor (e.g., the first communication processor 212, the second communication processor 214, and/or the integrated communication processor 260). For example, the gain of the LNA 601 may be changed based on a control signal input to the RFIC 501 from the at least one communication processor (e.g., the first communication processor 212, the second communication processor 214, and/or the integrated communication processor 260).

Referring to FIG. 6B, gain modes of the RFIC 501 (e.g., the LNA 601) are illustrated. According to various embodiments, the gain of the RFIC 501 (e.g., the LNA 601) may decrease according to the gain mode from G0 mode to G3 mode, and may increase according to the gain mode from G3 mode to G0 mode. In the graph of FIG. 6B, the X axis may indicate the size of a reception electric field (cell power) (e.g., the intensity of an RF signal within a downlink band) [dBm], and may show a cell power decreasing toward the +X direction (e.g., may show the absolute value of the cell power [dBm], which increases toward the same).

According to various embodiments, the electronic device 101 (e.g., the first communication processor 212, the second communication processor 214, and/or the integrated communication processor 260) may control the gain of the RFIC 501 (e.g., the LNA 601), based on a cell power (e.g., the intensity of an RF signal within a downlink band). For example, the electronic device 101 may control the gain of the RFIC 501 (e.g., the LNA 601) in a hysteresis scheme, based on the cell power. For example, a control using the hysteresis scheme may be performed based on information (e.g., a look-up table) stored in a memory (not illustrated) of a wireless communication module (e.g., the wireless communication module 192 in FIG. 2A and/or FIG. 2B).

Referring to FIG. 6B, when the cell power is increased to $P_{C1}$ from a value smaller than $P_{C1}$ (e.g., −58 dBm) (①), the electronic device 101 may control the RFIC 501 such that the gain mode of the RFIC 501 (e.g., the LNA 601) is changed from G2 mode to G3 mode (e.g., the gain of the RFIC 501 (e.g., the LNA 601) is reduced). When the cell power is reduced to $P_{C2}$ from a value equal to or greater than $P_{C2}$ (e.g., −60 dBm) (②), the electronic device 101 may control the RFIC 501 such that the gain mode of the RFIC 501 (e.g., the LNA 601) is changed from G3 mode to G2 mode (e.g., the gain of the RFIC 501 (e.g., the LNA 601) is increased). When the cell power is increased to $P_{C3}$ from a value smaller than $P_{C3}$ (e.g., −68 dBm) (③), the electronic device 101 may control the RFIC 501 such that the gain mode of the RFIC 501 (e.g., the LNA 601) is changed from G1 mode to G2 mode (e.g., the gain of the RFIC 501 (e.g., the LNA 601) is reduced). When the cell power is reduced to $P_{C4}$ from a value equal to or greater than $P_{C4}$ (e.g., −70 dBm) (④), the electronic device 101 may control the RFIC 501 such that the gain mode of the RFIC 501 (e.g., the LNA 601) is changed from G2 mode to G1 mode (e.g., the gain of the RFIC 501 (e.g., the LNA 601) is increased). When the cell power is increased to $P_{C5}$ from a value smaller than $P_{C5}$ (e.g., −78 dBm) (⑤), the electronic device 101 may control the RFIC 501 such that the gain mode of the RFIC 501 (e.g., the LNA 601) is changed from G0 mode to G1 mode (e.g., the gain of the RFIC 501 (e.g., the LNA 601) is reduced). When the cell power is reduced to $P_{C6}$ from a value equal to or greater than $P_{C6}$ (e.g., −80 dBm) (⑥), the electronic device 101 may control the RFIC 501 such that the gain mode of the RFIC 501 (e.g., the LNA 601) is changed from G1 mode to G0 mode (e.g., the gain of the RFIC 501 (e.g., the LNA 601) is increased).

According to various embodiments, when an RF signal within the first uplink band of the first operating band and an RF signal within the second uplink band of the second operating band are at least concurrently output (e.g., the performance of a 2TX operation) from the RFIC 501 to an RFFE (e.g., the first RFFE 232 and the second RFFE 234), the electronic device 101 may control the RFIC 501 so that the gain of the RFIC 501 (e.g., the LNA 601) is reduced, and this will be described in detail with reference to the drawings described below.

When the gain of the RFIC 501 (e.g., the LNA 601) is reduced, IIP3 characteristic of the RFIC 501 is improved (e.g., the absolute value of an IIP3 value is increased), and thus RX performance degradation (e.g., desense) can be reduced.

TABLE 1

| RFIC gain mode | G0 | G1 | G2 | G3 |
| --- | --- | --- | --- | --- |
| RFIC IIP3 [dBm] | 0 | −4 | −5 | −7 |
| RFIC NF [dB] | 13.5 | 14 | 14 | 19 |
| Desense [dB] | 14 | 6.85 | 5.38 | 3.03 |
| Default Sensitivity [dBm] | −100 | −99.9 | −99.9 | −98.5 |

Referring to Table 1, the smaller the gain of the RFIC 501 (e.g., G0 mode→G1 mode→G2 mode→G3 mode), the greater the absolute value of an RFIC IIP3 value, and thus RX performance degradation (e.g., desense) can be reduced. The smaller the gain of the RFIC 501, the greater the noise figure (NF) of the RFIC, but the entire system sensitivity (e.g., default sensitivity) may not that variable. Therefore, in a state where IMD components may be generated (e.g., while a 2TX operation is performed), RFIC IIP3 characteristic is increased through changing the gain mode of the RFIC 501 (e.g., reducing the gain of the RFIC 501), and thus RX performance (e.g., sensitivity) can be improved.

When an RF signal within the first uplink band of the first operating band and an RF signal within the second uplink band of the second operating band are at least concurrently output (e.g., a 2TX operation) from the RFIC 501 to an RFFE (e.g., the first RFFE 232 and the second RFFE 234), the electronic device 101 may control the gain of at least one LNA (e.g., the first LNA 505*a* and/or the second LNA 505*b*) disposed outside the RFIC 501 (e.g., included in the first RFFE 232 and/or the second RFFE 234).

TABLE 2

| External LNA gain mode | G0 | G1 | G2 |
| --- | --- | --- | --- |
| Gain [dB] | 19 | 15 | 9.7 |
| Desense [dB] | 14 | 6.8 | 1.4 |
| Default Sensitivity [dBm] | −100 | −99.3 | −98.6 |

Referring to Table 2, a decrease (e.g., G0 mode→G1 mode→G2 mode) in the gain of an external LNA (e.g., the first LNA 505*a* and/or the second LNA 505*b*) may reduce RX performance degradation (e.g., desense). This may indicate that the smaller the gain of the external LNA (e.g., the first LNA 505*a* and/or the second LNA 505*b*), the smaller the sizes of RF signals input to the RFIC 501 from the external LNA (e.g., the first LNA 505*a* and/or the second LNA 505*b*), and thus the size of an IMD component generated therefrom becomes small. A decrease in the gain of the external LNA (e.g., the first LNA 505*a* and/or the second LNA 505*b*) may vary the entire system sensitivity (e.g., default sensitivity). Referring to Table 1 together, a degree by which the entire system sensitivity (e.g., default sensitivity) varies when the gain of the external LNA (e.g., the first LNA 505*a* and/or the second LNA 505*b*) is reduced may be relatively larger than a degree by which the entire system sensitivity (e.g., default sensitivity) varies when the gain of the RFIC 501 is reduced.

Figure 7:
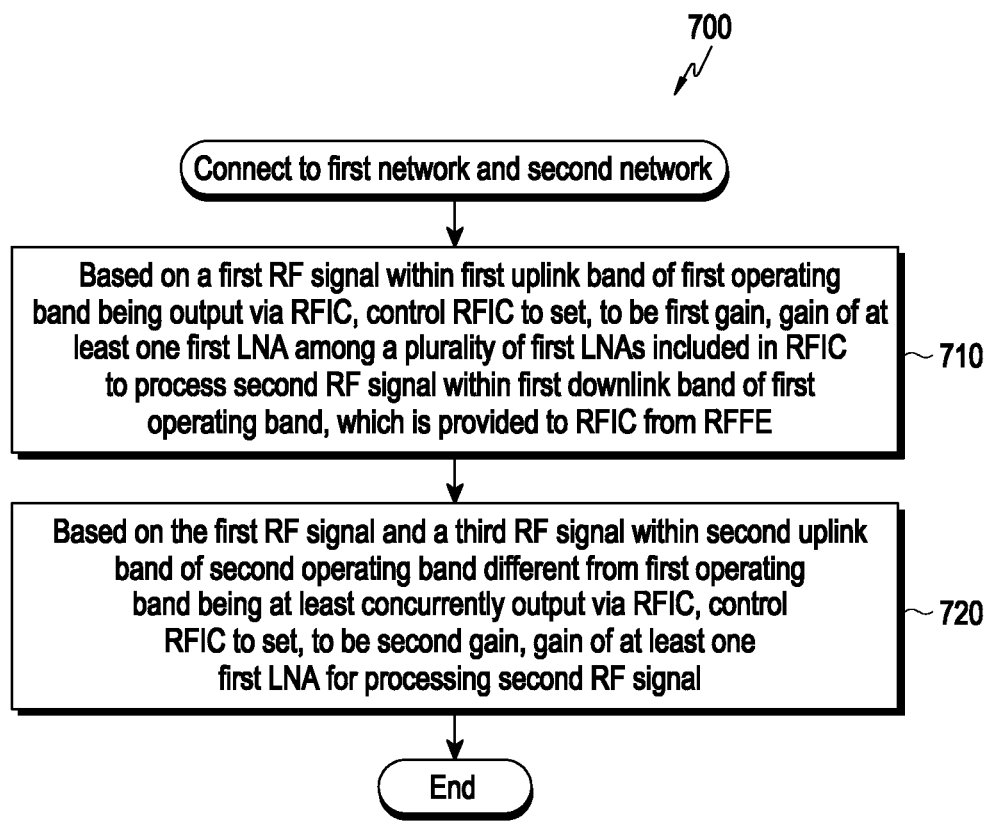
FIG. 7 is a flowchart illustrating a method for controlling the LNA gain of an RFIC by an electronic device according to whether a 2TX operation is performed according to various embodiments.

FIG. 7 is a flowchart 700 illustrating a method for controlling the LNA gain of an RFIC (e.g., the RFIC 501 in FIG. 5) by an electronic device (e.g., the electronic device 101 in FIG. 1) according to whether a 2TX operation is performed according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation). In another example, while operation 710 described below is performed, the electronic device may be connected to one network, and after secondary cell group (SCG) addition by MR-DC is completed, operation 720 may be performed. In another example, while operation 710 described below is performed, a signal is transmitted and received in one operating band of one network, and after SCG addition by configuration of CA is completed, operation 720 may be performed.

For example, the first network may be a first cellular network (e.g., the first cellular network 292 in FIG. 2A and/or FIG. 2B) (e.g., an LTE network) and the second network may be a second cellular network (e.g., the second cellular network 294 in FIG. 2A and/or FIG. 2B) (e.g., a 5G network). In this case, the first operating band may be an E-UTRA operating band, and the second operating band different from the first operating band may be an NR operating band. An RF signal within the first operating band (e.g., an RF signal within a first uplink band and/or an RF signal within a first downlink band) may be generated based on a first RAT (e.g., E-UTRA), and an RF signal within the second operating band (e.g., an RF signal within a second uplink band and/or an RF signal within a second downlink band) may be generated based on a second RAT (e.g., NR) different from the first RAT.

As another example, the first network and the second network may be the first cellular network 292 (e.g., an LTE network). In this case, the first operating band may be a first E-UTRA operating band (e.g., an operating band corresponding to a primary component carrier (PCC) of CA), and the second operating band may be a second E-UTRA operating band (e.g., an operating band corresponding to a secondary component carrier (SCC) of CA) different from the first E-UTRA operating band. An RF signal within the first operating band (e.g., an RF signal within a first uplink band and/or an RF signal within a first downlink band) and an RF signal within the second operating band (e.g., an RF signal within a second uplink band and/or an RF signal within a second downlink band) may be generated based on one RAT (e.g., E-UTRA).

According to various embodiments, the electronic device 101 may, in operation 710, based on a first RF signal within a first uplink band of the first operating band being output via an RFIC (e.g., the RFIC 501 in FIG. 5), control the RFIC 501 to set, to be a first gain, a gain of at least one first LNA among a plurality of first LNAs (e.g., the LNA 601 in FIG. 6A) included in the RFIC 501 to process (e.g., amplify) a second RF signal within a first downlink band of the first operating band, which is provided to the RFIC 501 from an RFFE (e.g., the first RFFE 232 and the second RFFE 234 in FIG. 2A and/or FIG. 2B). According to various embodiments, the electronic device 101 may identify a cell power (e.g., the strength of the second RF signal), and determine the first gain, based on identified strength. For example, referring to FIG. 6B, the electronic device 101 may control the gain of at least one first LNA for processing the second RF signal in a hysteresis scheme, based on the cell power (e.g., the strength of the second RF signal). In another example, the first gain may be a default value, and there is no limit to a scheme of configuring the first gain.

According to various embodiments, the electronic device 101 may, in operation 720, based on the first RF signal and a third RF signal within a second uplink band of the second operating band different from the first operating band being at least concurrently output via the RFIC 501, control the RFIC 501 to set, to be a second gain, the gain of the at least one first LNA for processing the second RF signal. For example, while the electronic device 101 performs a 2TX operation, the RFIC 501 may generate the first RF signal within the first uplink band and the third RF signal within the second uplink band, and may at least concurrently output the first RF signal and the third RF signal to the RFFE (the first RFFE 232 and the second RFFE 234 in FIG. 2A and/or FIG. 2B). According to various embodiments, the electronic device 101 may determine the gain of the at least one first LNA to be the second gain smaller than the first gain. According to an embodiment, the electronic device 101 may determine the second gain smaller than the first gain, based on the cell power (e.g., the strength of the second RF signal). According to an embodiment, the electronic device 101 may, based on the first RF signal and the third RF signal being at least concurrently output via the RFIC 501, when transmission power (TX power) (e.g., the strength of the first RF signal input to the first antenna module 242 and the strength of the third RF signal input to the second antenna module 244 in FIG. 2A and/or FIG. 2B) of the first RF signal and the third RF signal is equal to or greater than a threshold value, determine the second gain and/or control the RFIC 501 to set the gain of the at least one first LNA to be the second gain. According to an embodiment, the electronic device 101 may determine the second gain, and/or control the RFIC 501 to set the gain of the at least one first LNA to be the second gain when the first operating band and the second operating band are operating bands wherein an IMD component caused by the first RF signal and the third RF signal is able to affect an RF signal within a downlink band.

According to an embodiment, the electronic device 101 may also control a gain of at least one first LNA (e.g., the first LNA 505*a* and/or the second LNA 505*b*) disposed outside the RFIC 501 (e.g., included in the first RFFE 232 and/or the second RFFE 234), based on whether the first RF signal and the third RF signal are at least concurrently output via the RFIC 501.

According to an embodiment, the electronic device 101 may change a highest gain mode of the at least one first LNA, based on the first RF signal and the third RF signal being at least concurrently output via the RFIC 501. The electronic device 101 may limit the maximum gain of the at least one first LNA, based on the first RF signal and the third RF signal being at least concurrently output via the RFIC 501.

Figure 8:
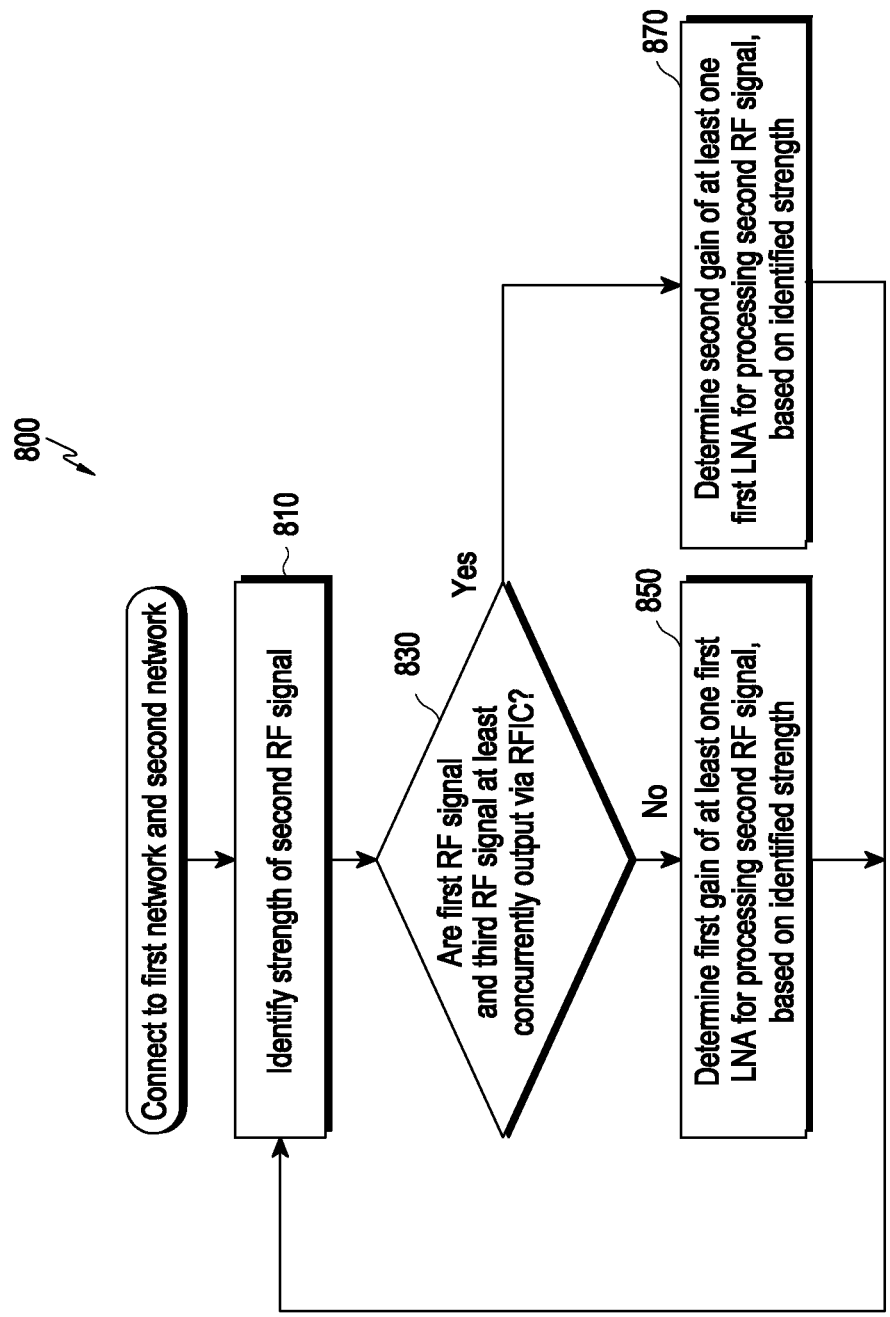
FIG. 8 is a flowchart illustrating a method for controlling the gain of at least one LNA for reception of a second RF signal by an electronic device, based on a reception electric field according to various embodiments.

FIG. 8 is a flowchart 800 illustrating a method for controlling the gain of at least one LNA (e.g., the LNA 601 in FIG. 6A) for reception of a second RF signal by an electronic device (e.g., the electronic device 101 in FIG. 1), based on a cell power according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation).

According to various embodiments, the electronic device 101 may, in operation 810, identify the strength (e.g., a cell power) of a second RF signal. For example, the second RF signal may include an RF signal within a downlink band of the first operating band.

According to various embodiments, the electronic device 101 may, in operation 830, identify whether a first RF signal and a third RF signal are at least concurrently output via an RFIC (e.g., the RFIC 501 in FIG. 5) (e.g., whether a 2TX operation is performed).

According to various embodiments, when it is identified that the first RF signal and the third RF signal are not at least concurrently output (e.g., when one of the first RF signal or the third RF signal is output—No—in operation 830), the electronic device 101 may, in operation 850, determine a first gain of at least one first LNA (e.g., the LNA 601) for processing the second RF signal, based on the identified strength. According to various embodiments, the electronic device 101 may control the RFIC 501 to set, to be the first gain, a gain of the at least one first LNA (e.g., the LNA 601). For example, referring to FIG. 6B, the electronic device may control the gain of the at least one first LNA for processing the second RF signal in a hysteresis scheme, based on the strength of the second RF signal.

According to various embodiments, when it is identified that the first RF signal and the third RF signal are at least concurrently output (Yes—in operation 830), the electronic device 101 may, in operation 870, determine a second gain of the at least one first LNA for processing the second RF signal, based on the identified strength. For example, the electronic device 101 may determine the second gain to be smaller than the first gain. For example, referring to FIG. 6B, when the first gain is a gain corresponding to G0 mode, the second gain may be determined to be a gain corresponding to G1 mode. As another example, the second gain may be determined to be a gain corresponding to G1 mode even when the strength of the second RF signal is reduced to $P_{C6}$ or lower. According to various embodiments, the electronic device 101 may control the RFIC 501 to set, to be the determined second gain, a gain of the at least one first LNA (e.g., the LNA 601).

According to various embodiments, after performing operation 850 or operation 870, the electronic device 101 may perform operation 810 again to perform at least one of the operations following operation 830.

Figure 9:
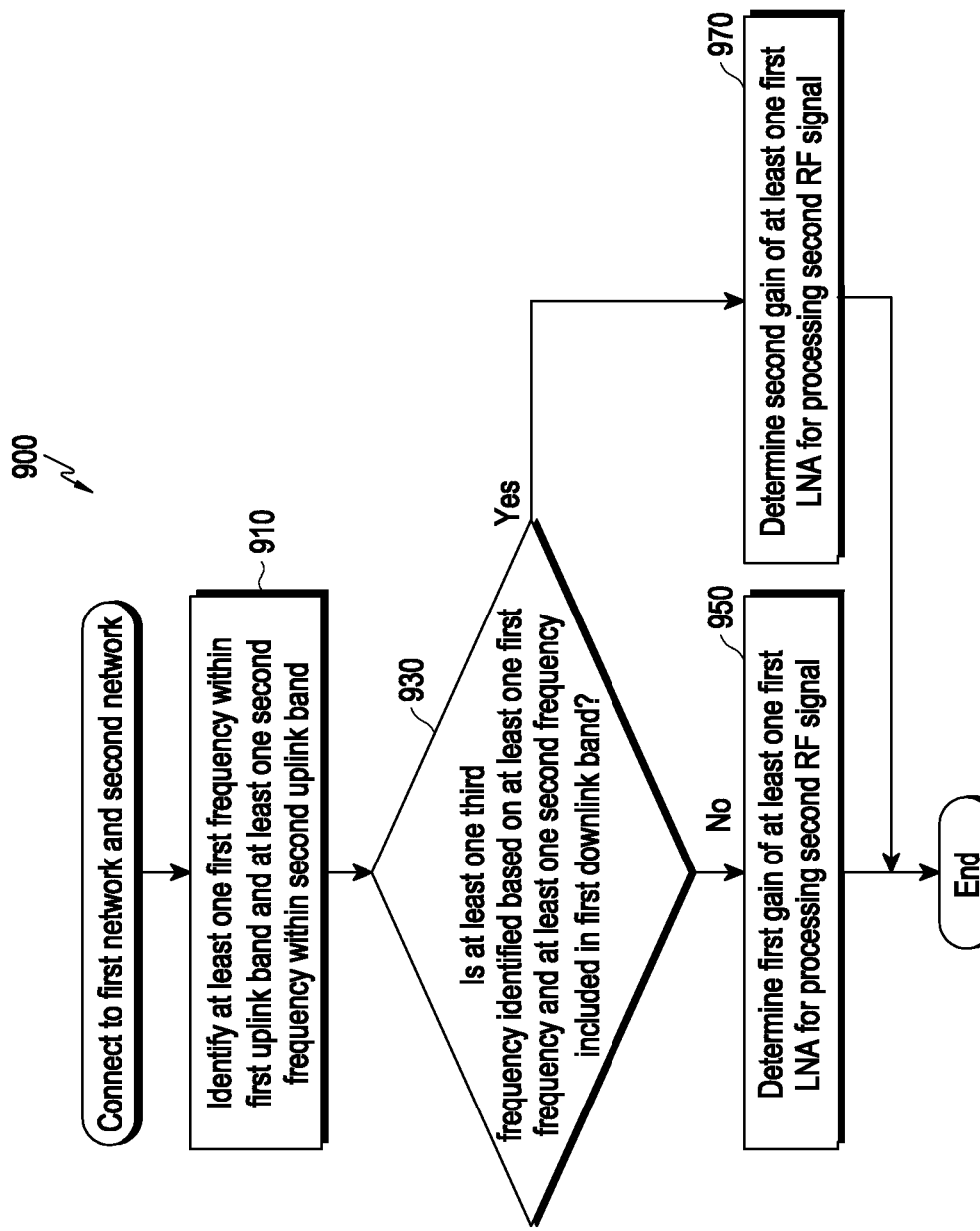
FIG. 9 is a flowchart illustrating a method for controlling the gain of at least one LNA for reception of a second RF signal by an electronic device, based on frequency ranges of a first operating band and a second operating band according to various embodiments.

FIG. 9 is a flowchart 900 illustrating a method for controlling the gain of at least one LNA (e.g., the LNA 601 in FIG. 6A) for reception of a second RF signal by an electronic device (e.g., the electronic device 101 in FIG. 1), based on frequency ranges of a first operating band and a second operating band according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation).

According to various embodiments, the electronic device 101 may, in operation 910, identify at least one first frequency within a first uplink band and at least one second frequency within a second uplink band. For example, the at least one first frequency may include a frequency included in a frequency range of the first uplink band. For example, the at least one second frequency may include a frequency included in a frequency range of the second uplink band.

For example, the electronic device 101 may, in operation 930, identify whether at least one third frequency identified based on the at least one first frequency and the at least one second frequency is included in a first downlink band. For example, the at least one third frequency may correspond to an IMD3 component of the at least one first frequency and the at least one second frequency. For example, referring to FIG. 4, the electronic device 101 may calculate the frequency (e.g., 2f1–f2 and/or 2f2–f1) of an IMD (e.g., IMD3) component, based on the at least one first frequency (e.g., f1) and the at least one second frequency (e.g., f2). The electronic device 101 may identify whether the calculated frequency of the IMD component is included in the frequency range of the first downlink band. As described above, the electronic device 101 may directly calculate the IMD component to determine a gain of an LNA. In another example, the electronic device 101 may store, in advance, information of a combination of operating bands having a possibility that transmission signals affect a reception RF signal in a 2TX mode. The electronic device 101 may also determine whether operating bands of 2TX modes correspond to pre-stored information.

According to various embodiments, when it is identified that the identified at least one third frequency is not included in the first downlink band (No—in operation 930), the electronic device 101 may, in operation 950, determine a first gain of at least one first LNA (e.g., the LNA 601) for processing a second RF signal (e.g., an RF signal within the first downlink band). For example, the electronic device 101 may determine the first gain, based on the strength (e.g., a cell power) of the second RF signal. According to various embodiments, the electronic device 101 may control the RFIC 501 to set, to be the first gain, a gain of the at least one first LNA (e.g., the LNA 601).

According to various embodiments, when it is identified that the identified at least one third frequency is included in the first downlink band (Yes—in operation 930), the electronic device 101 may, in operation 970, determine a second gain of the at least one first LNA for processing the second RF signal. For example, the electronic device 101 may determine the second gain to be less than the first gain. According to various embodiments, when it is identified that the identified at least one third frequency is included in the first downlink band, the electronic device 101 may, based on a first RF signal and a third RF signal being at least concurrently output, determine the second gain of the at least one first LNA (e.g., the LNA 601), and control the RFIC 501 to set a gain of the at least one first LNA (e.g., the LNA 601) to be the determined second gain.

According to various embodiments, after performing operation 950 or operation 970, the electronic device 101 may perform operation 910 again.

Figure 10:
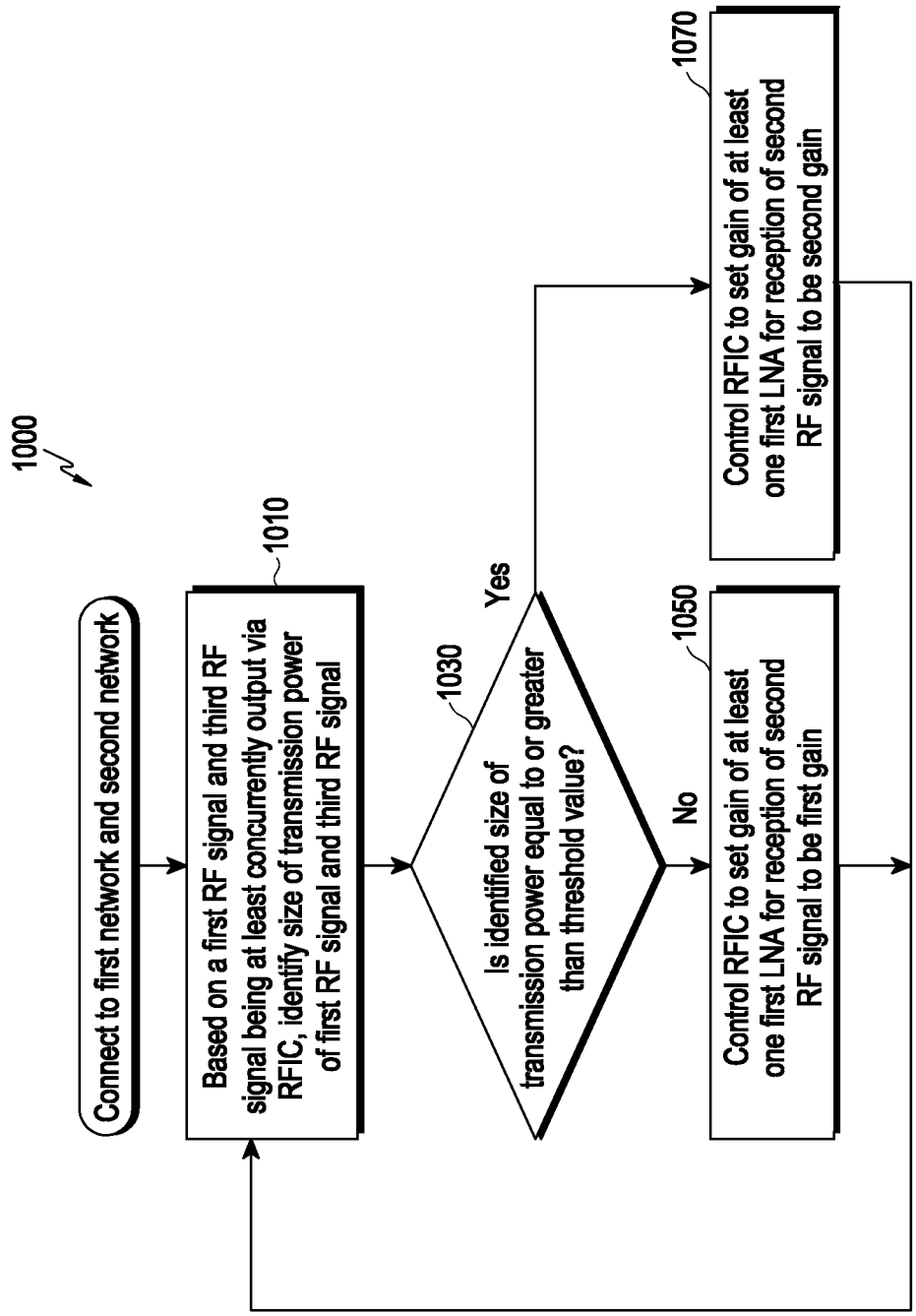
FIG. 10 is a flowchart illustrating a method for controlling the gain of at least one LNA for reception of a second RF signal by an electronic device, based on transmission power of a first RF signal and a third RF signal according to various embodiments.

FIG. 10 is a flowchart 1000 illustrating a method for controlling the gain of at least one LNA (e.g., the LNA 601 in FIG. 6A) for reception of a second RF signal by an electronic device (e.g., the electronic device 101 in FIG. 1), based on transmission power of a first RF signal and a third RF signal according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation).

According to various embodiments, the electronic device 101 may, in operation 1010, based on a first RF signal (e.g., an RF signal within a first downlink band) and a third RF signal (e.g., an RF signal within a second downlink band) being at least concurrently output via an RFIC (e.g., the RFIC 501 in FIG. 5), identify a size of transmission power of the first RF signal and the third RF signal. According to various embodiments, the electronic device 101 may identify the size of the transmission power of the first RF signal and the third RF signal when the strength (e.g., cell power) of a second RF signal (e.g., an RF signal within the first downlink band) is equal to or smaller than a threshold strength. For example, referring to FIG. 6B, the threshold strength may include $P_{C6}$ at which a gain of at least one first LNA is determined to be a gain corresponding to G0 mode. According to various embodiments, the electronic device 101 may identify the size of the transmission power of the first RF signal and the third RF signal when the gain of the at least one first LNA exceeds a predetermined gain. For example, referring to FIG. 6B, the electronic device 101 may identify the size of the transmission power of the first RF signal and the third RF signal when the gain of the at least one first LNA exceeds a gain corresponding to G1 mode, or a gain mode of the at least one first LNA is G0 mode.

According to various embodiments, the electronic device 101 may, in operation 1030, identify whether the identified size of the transmission power is equal to or greater than a threshold value.

According to various embodiments, when it is identified that the identified size of the transmission power is less than the threshold value (No—in operation 1030), the electronic device 101 may, in operation 1050, control the RFIC 501 to set a gain of at least one first LNA for reception of the second RF signal to be a first gain. For example, the electronic device 101 may determine the first gain, based on the strength (e.g., a cell power) of the second RF signal.

According to various embodiments, when it is identified that the identified size of the transmission power is equal to or greater than the threshold value (Yes—in operation 1030), the electronic device 101 may, in operation 1070, control the RFIC 501 to set the gain of the at least one first LNA for reception of the second RF signal to be a second gain. For example, the electronic device 101 may determine the second gain to be smaller than the first gain.

According to various embodiments, after performing operation 1050 or operation 1070, the electronic device 101 may perform operation 1010 again to perform at least one of the operations following operation 1030.

Figure 11:
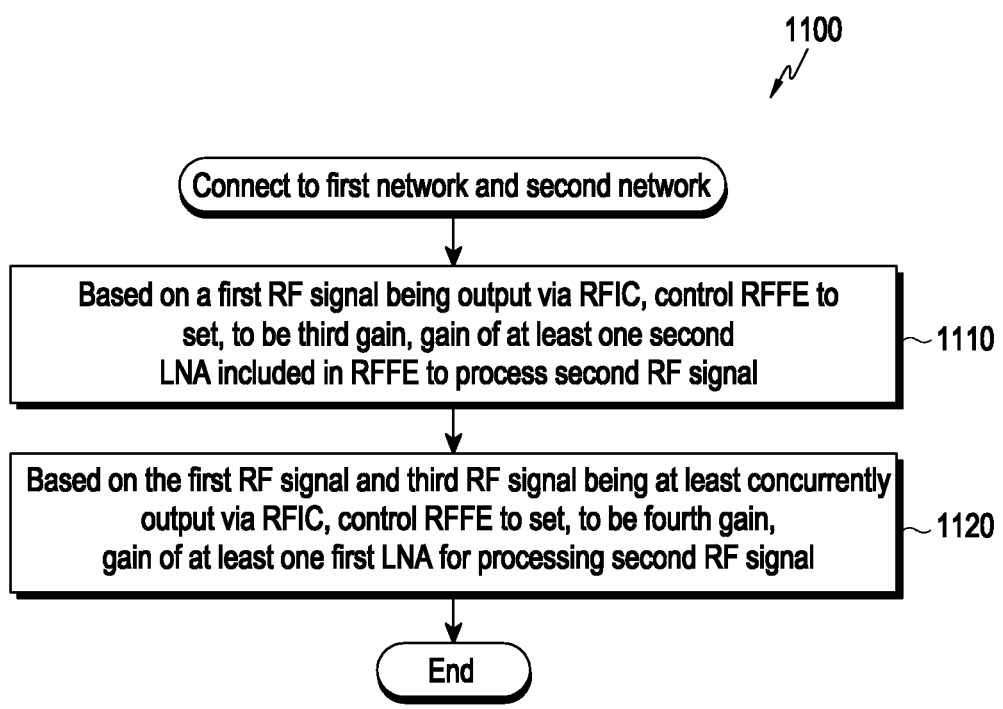
FIG. 11 is a flowchart illustrating a method for controlling the gain of at least one LNA disposed outside an RFIC by an electronic device according to whether a 2TX operation is performed according to various embodiments.

FIG. 11 is a flowchart 1100 illustrating a method for controlling the gain of at least one LNA (e.g., the first LNA 505a and/or the second LNA 505b in FIG. 2A and/or FIG. 2B) disposed outside an RFIC (e.g., the RFIC 501 in FIG. 5) (e.g., included in the first RFFE 232 and/or the second RFFE 234 in FIG. 2A and/or FIG. 2B) by an electronic device (e.g., the electronic device 101 in FIG. 1) according to whether a 2TX operation is performed according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation).

According to various embodiments, the electronic device 101 may, in operation 1110, based on a first RF signal (e.g., an RF signal within a first uplink band) being output via the RFIC 501, control an RFFE (e.g., the first RFFE 232 and/or the second RFFE 234) to set, to be a third gain, a gain of at least one second LNA (e.g., the first LNA 505a and/or the second LNA 505b) included in the RFFE (e.g., the first RFFE 232 and/or the second RFFE 234) to process (e.g., amplify) a second RF signal (e.g., an RF signal within a first downlink band). For example, the third gain may be determined based on the strength (e.g., cell power) of the second RF signal (e.g., an RF signal within the first uplink band).

According to various embodiments, the electronic device 101 may, in operation 1120, based on the first RF signal and a third RF signal (e.g., an RF signal within a second uplink band) being at least concurrently output via the RFIC 501, control the RFFE (e.g., the first RFFE 232 and/or the second RFFE 234) to set, to be a fourth gain, a gain of the at least one second LNA for processing the second RF signal. For example, the electronic device 101 may determine the fourth gain to be smaller than the third gain.

According to various embodiments, operation 1110 and/or operation 1130 described above may be performed in parallel to (e.g., regardless of) at least one operation for controlling a gain of at least one first LNA (e.g., the LNA 601 in FIG. 6A) of the RFIC 501. According to various embodiments, operation 1110 and/or operation 1130 described above may also be performed together with at least one operation for controlling a gain of at least one first LNA (e.g., the LNA 601) of the RFIC 501.

Figure 12:
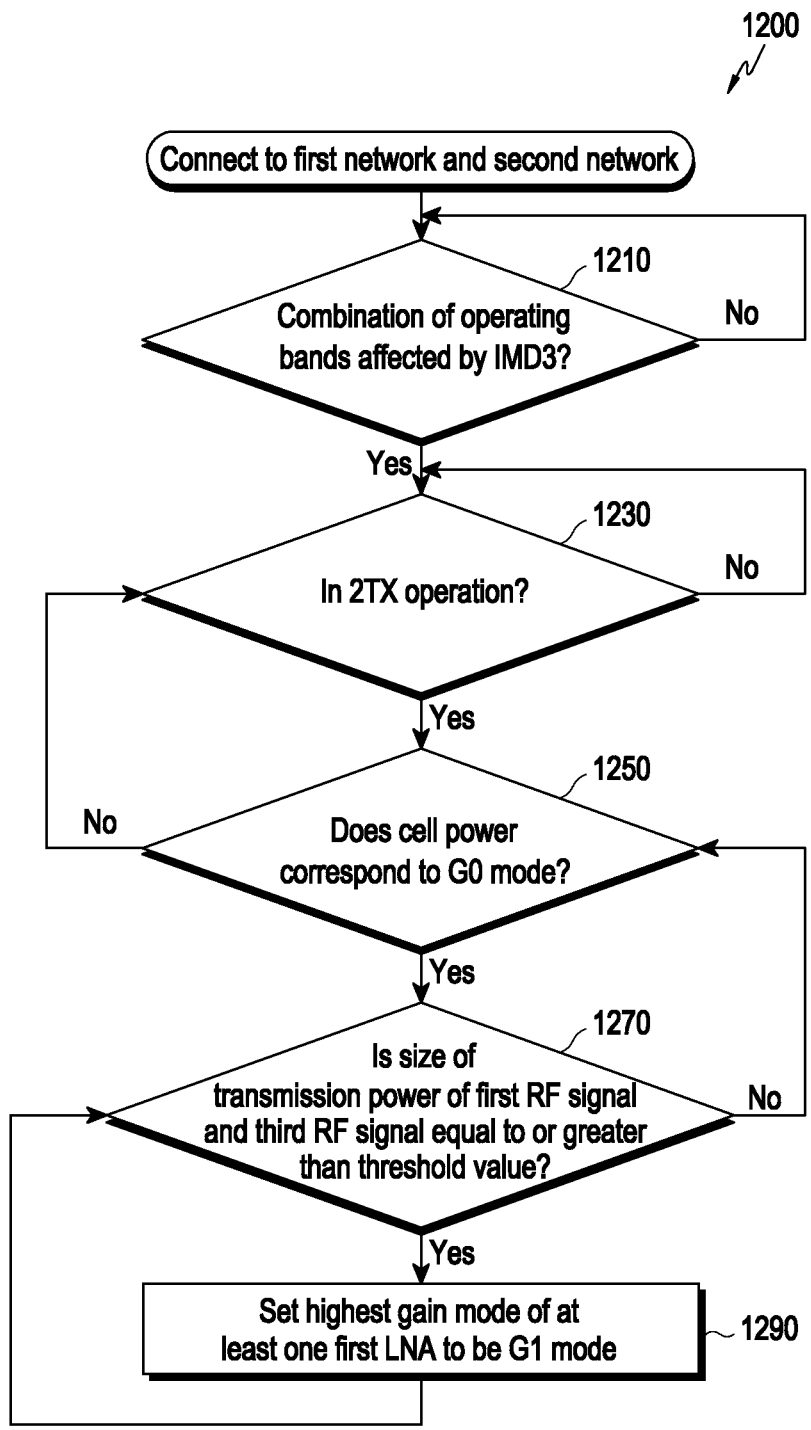
FIG. 12 is a flowchart illustrating a method for controlling the maximum LNA gain of an RFIC by an electronic device according to whether a 2TX operation is performed according to various embodiments.

FIG. 12 is a flowchart 1200 illustrating a method for controlling the maximum LNA gain of an RFIC (e.g., the RFIC 501 in FIG. 5) by an electronic device (e.g., the electronic device 101 in FIG. 1) according to whether a 2TX operation is performed according to various embodiments.

According to various embodiments, the electronic device 101 may be in a state of connection to a first network and a second network. According to various embodiments, the electronic device 101 may be connected to the first network and the second network and thus may be able to at least concurrently generate and/or transmit RF signals within an operating band (hereinafter, a first operating band) of the first network and an operating band (hereinafter, a second operating band) of the second network (e.g., may be able to perform a 2TX operation).

According to various embodiments, the electronic device 101 may, in operation 1210, identify whether the operating bands correspond to a combination of operating bands affected by IMD3. For example, the electronic device 101 may identify whether at least one third frequency identified based on at least one first frequency within a first uplink band and at least one second frequency within a second uplink band is included in a first downlink band. According to various embodiments, when it is identified that the operating bands do not correspond to the combination of operating bands affected by IMD3 (No—in operation 1210), the electronic device 101 may perform operation 1210 again.

According to various embodiments, when it is identified that the operating bands corresponds to the combination of operating bands affected by IMD3 (Yes—in operation 1210), the electronic device 101 may, in operation 1230, identify whether the electronic device is in a 2TX operation (e.g., whether a 2TX operation is being performed). For example, the electronic device 101 may identify whether a first RF signal (e.g., an RF signal within the first uplink band) and a third RF signal (e.g., an RF signal within the second uplink bandwidth) are at least concurrently output. According to various embodiments, when it is identified that the first RF signal and the third RF signal are not at least concurrently output (e.g., when one of the first RF signal or the third RF signal is output—No—in operation 1230), the electronic device 101 may perform operation 1230 again. According to various embodiments, when it is identified that the first RF signal and the third RF signal are not at least concurrently output, the electronic device 101 may, in operation 850, determine a gain of at least one first LNA (e.g., the LNA 601 in FIG. 6A) within a range equal to or less than a gain corresponding to G0 mode, based on the strength of a second RF signal (e.g., an RF signal within a first downlink band).

According to various embodiments, when it is identified that the electronic device is in a 2TX operation (Yes—in operation 1230), the electronic device 101 may, in operation 1250, identify whether the cell power is a cell power corresponding to G0 mode. For example, referring to FIG. 6B, the electronic device 101 may identify whether the strength of the second RF signal is smaller than a threshold strength (e.g., $P_{C8}$). According to various embodiments, when it is identified that the cell power is not the cell power corresponding to G0 mode (No—in operation 1250), the electronic device 101 may perform operation 1230 again.

According to various embodiments, when it is identified that the cell power is the cell power corresponding to G0 mode (Yes—in operation 1250), the electronic device 101 may, in operation 1270, identify whether a size of transmission power of the first RF signal and the third RF signal is equal to or greater than a threshold value. According to various embodiments, when it is identified that the size of the transmission power of the first RF signal and the third RF signal is less than the threshold value (No—in operation 1270), the electronic device 101 may perform operation 1250 again. According to various embodiments, when it is identified that the size of the transmission power of the first RF signal and the third RF signal is less than the threshold value, the electronic device 101 may set a highest gain mode of the at least one first LNA (e.g., the LNA 601) to be G0 mode. According to various embodiments, the electronic device 101 may set a gain mode of the at least one first LNA (e.g., the LNA 601) to be G0 mode. For example, the electronic device 101 may set a gain of the at least one first LNA (e.g., the LNA 601) to be a gain corresponding to G0 mode.

According to various embodiments, when it is identified that the size of the transmission power of the first RF signal and the third RF signal is equal to or greater than the threshold value (Yes—in operation 1270), the electronic device 101 may, in operation 1290, set a highest gain mode of the at least one first LNA (e.g., the LNA 601) to be G1 mode. According to various embodiments, the electronic device 101 may set a gain mode of the at least one first LNA (e.g., the LNA 601) to be a gain mode (e.g., G1, G2, G3, or G4) equal or lower than G1 mode. For example, the electronic device 101 may limit a gain of the at least one first LNA (e.g., the LNA 601) (e.g., determine the gain to be a gain within a range equal to or lower than a gain corresponding to G1 mode). According to various embodiments, after performing operation 1290, the electronic device 101 may perform operation 1270 again.

According to various embodiments, after performing operation 1290, the electronic device 101 may perform operation 1210, operation 1230, operation 1250, and/or operation 1270, and when a condition is not satisfied (e.g., operation 1210—NO, operation 1230—NO, operation 1250—NO, and/or operation 1270—NO), the electronic device may set a highest gain mode of the at least one first LNA (e.g., the LNA 601) to be G0 mode. According to various embodiments, the electronic device 101 may set a gain mode of the at least one first LNA (e.g., the LNA 601) to be a gain mode (e.g., G0, G1, G2, G3, or G4) equal or lower than G1 mode, based on the cell power.

According to various embodiments, the electronic device may include: a radio frequency integrated circuit (RFIC) including a plurality of first low noise amplifiers (LNAs) (e.g., the LNA 601); at least one radio frequency front end (RFFE) (e.g., the first RFFE 232 and the second RFFE 234) operatively connected to the RFIC; and at least one communication processor (e.g., the first communication processor 212, the second communication processor 214, and/or the integrated communication processor 260) operatively connected to the RFIC, wherein the at least one communication processor is configured to: based on a first RF signal within a first uplink band of a first operating band being output via the RFIC, control the RFIC to set, to be a first gain, a gain of at least one first LNA among the plurality of first LNAs configured to process a second RF signal within a first downlink band of the first operating band provided from the at least one RFFE to the RFIC, and based on the first RF signal and a third RF signal within a second uplink band of a second operating band different from the first operating band being at least concurrently output via the RFIC, control the RFIC to set, to be a second gain, the gain of the at least one first LNA configured to process the second RF signal provided from the at least one RFFE to the RFIC, wherein the second gain is less than the first gain.

According to various embodiments, the first RF signal may be generated based on a first radio access technology (RAT), and the second RF signal may be generated based on a second RAT different from the first RAT.

According to various embodiments, the first RF signal and the second RF signal may be generated based on one RAT.

According to various embodiments, the at least one communication processor may be further configured to identify a strength of the second RF signal, and based on the first RF signal and the third RF signal being at least concurrently output via the RFIC, determine the second gain, based on the identified strength.

According to various embodiments, the at least one communication processor may be further configured to: identify whether at least one third frequency identified based on at least one first frequency within the first uplink band and at least one second frequency within the second uplink band is included in the first downlink band.

According to various embodiments, the at least one third frequency may correspond to an intermodulation distortion (IMD) 3 component of the at least one first frequency and the at least one second frequency.

According to various embodiments, the at least one communication processor may be further configured to, based on identifying that the at least one third frequency is included in the first downlink band, determine the second gain.

According to various embodiments, the at least one communication processor may be further configured to: based on the first RF signal and the third RF signal being at least concurrently output, identify a size of transmission power of the first RF signal and the third RF signal, and based on the identified size of transmission power being equal to or greater than a threshold value, control the RFIC to set the gain of the at least one first LNA to be the second gain.

According to various example embodiments, the at least one communication processor may be further configured to: based on the identified size of transmission power being less than the threshold value, set the gain of the at least one first LNA to be the first gain.

According to various embodiments, each of the at least one RFFE may include at least one second LNA (e.g., the first LNA 505*a* and the second LNA 505*b*) configured to process an RF signal within the first downlink band provided to the RFIC, the at least one communication processor may be further configured to: based on the first RF signal being output, control the at least one RFFE to set a gain of the at least one second LNA to be a third gain, and based on the first RF signal and the third RF signal being at least concurrently output, control the at least one RFFE to set the gain of the at least one second LNA to be a fourth gain, wherein the fourth gain may be less than the third gain.

According to various embodiments, a method for controlling an electronic device may include: based on a first RF signal within a first uplink band of a first operating band being output via a radio frequency integrated circuit (RFIC) of the electronic device, controlling the RFIC to set, to be a first gain, a gain of at least one first low noise amplifier (LNA) among a plurality of first LNAs included in the RFIC to process a second RF signal within a first downlink band of the first operating band provided from a radio frequency front end (RFFE) of the electronic device to the RFIC; and based on the first RF signal and a third RF signal within a second uplink band of a second operating band different from the first operating band being at least concurrently output via the RFIC, controlling the RFIC to set, to be a second gain, the gain of the at least one first LNA configured to process the second RF signal provided from the at least one RFFE to the RFIC, wherein the second gain is less than the first gain.

According to various embodiments, the first RF signal may be generated based on a first radio access technology (RAT), and the second RF signal may be generated based on a second RAT different from the first RAT.

According to various embodiments, the first RF signal and the second RF signal may be generated based on one RAT.

According to various embodiments, the method for controlling the electronic device may further include: identifying a strength of the second RF signal; and when the first RF signal and the third RF signal are at least concurrently output via the RFIC, determining the second gain, based on the identified strength.

According to various embodiments, the method for controlling the electronic device may further include identifying whether at least one third frequency identified based on at least one first frequency within the first uplink band and at least one second frequency within the second uplink band is included in the first downlink band.

According to various embodiments, the at least one third frequency may correspond to an intermodulation distortion (IMD) 3 component of the at least one first frequency and the at least one second frequency.

According to various embodiments, the method for controlling the electronic device may further include, based on identification that the at least one third frequency is included in the first downlink band, determining the second gain.

According to various embodiments, the controlling of the RFIC to set, to be the second gain, the gain of the at least one first LNA configured to process the second RF signal, based on the first RF signal and the third RF signal being at least concurrently output via the RFIC may include: based on the first RF signal and the third RF signal being at least concurrently output, identifying a size of transmission power of the first RF signal and the third RF signal; and based on the identified size of transmission power being equal to or greater than a threshold value, controlling the RFIC to set the gain of the at least one first LNA to be the second gain.

According to various embodiments, the method for controlling the electronic device may further include, based on the identified size of transmission power being less than the threshold value, setting the gain of the at least one first LNA to be the first gain.

According to various embodiments, a non-transitory computer-readable recording medium may store instructions which, when executed, cause at least one communication processor of an electronic device to, based on a first RF signal within a first uplink band of a first operating band being output via a radio frequency integrated circuit (RFIC) of the electronic device, control the RFIC to set, to be a first gain, a gain of at least one first low noise amplifier (LNA) among a plurality of first LNAs included in the RFIC to process a second RF signal within a first downlink band of the first operating band provided from a radio frequency front end (RFFE) of the electronic device to the RFIC, and based on the first RF signal and a third RF signal within a second uplink band of a second operating band different from the first operating band being at least concurrently output via the RFIC, control the RFIC to set, to be a second gain, the gain of the at least one first LNA configured to process the second RF signal provided from the at least one RFFE to the RFIC, wherein the second gain is less than the first gain.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a radio frequency integrated circuit (RFIC);
   a plurality of first low noise amplifiers (LNAs);
   at least one radio frequency front end (RFFE) operatively connected to the RFIC;
   at least one communication processor operatively connected to the RFIC; and
   memory storing instructions,
   wherein the instructions, when executed by the at least one communication processor, cause the electronic device to:
   based on a first RF signal within a first uplink band of a first operating band being output via the RFIC, control the RFIC to set, to a first gain, a gain of at least one first LNA among the plurality of first LNAs configured to process a second RF signal received within a first downlink band of the first operating band provided from the at least one RFFE to the RFIC, and
   based on the first RF signal and a third RF signal within a second uplink band of a second operating band different from the first operating band being concurrently output via the RFIC, control the RFIC to set, to a second gain, the gain of the at least one first LNA configured to process the second RF signal provided from the at least one RFFE to the RFIC,
   wherein the second gain is less than the first gain.

2. The electronic device of claim 1, wherein the first RF signal is generated based on a first radio access technology (RAT), and the second RF signal is generated based on a second RAT different from the first RAT.

3. The electronic device of claim 1, wherein the first RF signal and the second RF signal are generated based on one RAT.

4. The electronic device of claim 1, wherein the instructions, when executed by the at least one communication processor, cause the electronic device to:
   identify a strength of the second RF signal, and
   based on the first RF signal and the third RF signal being at least concurrently output via the RFIC, determine the second gain, based on the identified strength.

5. The electronic device of claim 1, wherein the instructions, when executed by the at least one communication processor, cause the electronic device to identify whether at least one third frequency identified based on at least one first frequency within the first uplink band and at least one second frequency within the second uplink band is included in the first downlink band.

6. The electronic device of claim 5, wherein the at least one third frequency corresponds to an intermodulation distortion (IMD) 3 component of the at least one first frequency and the at least one second frequency.

7. The electronic device of claim 5, wherein the instructions, when executed by the at least one communication processor, cause the electronic device to, based on identifying that the at least one third frequency is included in the first downlink band, determine the second gain.

8. The electronic device of claim 1, wherein the instructions, when executed by the at least one communication processor, cause the electronic device to:
   based on the first RF signal and the third RF signal being at least concurrently output, identify a size of transmission power of the first RF signal and the third RF signal, and
   based on the identified size of transmission power being equal to or greater than a threshold value, control the RFIC to set the gain of the at least one first LNA to be the second gain.

9. The electronic device of claim 8, wherein the instructions, when executed by the at least one communication processor, cause the electronic device to: based on the identified size of transmission power being less than the threshold value, set the gain of the at least one first LNA to be the first gain.

10. The electronic device of claim 1, wherein each of the at least one RFFE comprises at least one second LNA configured to process an RF signal within the first downlink band provided to the RFIC,
    wherein the instructions, when executed by the at least one communication processor, cause the electronic device to:
    based on the first RF signal being output, control the at least one RFFE to set a gain of the at least one second LNA to be a third gain, and
    based on the first RF signal and the third RF signal being at least concurrently output, control the at least one RFFE to set the gain of the at least one second LNA to be a fourth gain,
    wherein the fourth gain is less than the third gain.

11. A method for controlling an electronic device, the method comprising:
    based on a first RF signal within a first uplink band of a first operating band being output via a radio frequency integrated circuit (RFIC) of the electronic device, controlling the RFIC to set, to a first gain, a gain of at least one first low noise amplifier (LNA) among a plurality of first LNAs included in the electronic device to process a second RF signal received within a first downlink band of the first operating band provided from a radio frequency front end (RFFE) of the electronic device to the RFIC; and based on the first RF signal and a third RF signal within a second uplink band of a second operating band different from the first operating band being concurrently output via the RFIC, controlling the RFIC to set, to a second gain, the gain of the at least one first LNA configured to process the second RF signal provided from the at least one RFFE to the RFIC, wherein the second gain is less than the first gain.

12. The method of claim 11, wherein the first RF signal is generated based on a first radio access technology (RAT), and the second RF signal is generated based on a second RAT different from the first RAT.

13. The method of claim 11, wherein the first RF signal and the second RF signal are generated based on one RAT.

14. The method of claim 11, further comprising:
identifying a strength of the second RF signal; and
when the first RF signal and the third RF signal are at least concurrently output via the RFIC, determining the second gain, based on the identified strength.

15. The method of claim 11, further comprising identifying whether at least one third frequency identified based on at least one first frequency within the first uplink band and at least one second frequency within the second uplink band is included in the first downlink band.

16. The method of claim 15, wherein the at least one third frequency corresponds to an intermodulation distortion (IMD) 3 component of the at least one first frequency and the at least one second frequency.

17. The method of claim 15, further comprising, based on identifying that the at least one third frequency is included in the first downlink band, determining the second gain.

18. The method of claim 11, wherein the controlling of the RFIC to configure, to be the second gain, the gain of the at least one first LNA configured to process the second RF signal, based on the first RF signal and the third RF signal being at least concurrently output via the RFIC comprises:

based on the first RF signal and the third RF signal being at least concurrently output, identifying a size of transmission power of the first RF signal and the third RF signal; and based on the identified size of transmission power being equal to or greater than a threshold value, controlling the RFIC to set the gain of the at least one first LNA to be the second gain.

19. The method of claim 18, further comprising, based on the identified size of transmission power being less than the threshold value, setting the gain of the at least one first LNA to be the first gain.

20. A non-transitory computer-readable storage medium storing instructions which, when executed by at least one communication processor of an electronic device, cause the electronic device to, based on a first RF signal within a first uplink band of a first operating band is output via a radio frequency integrated circuit (RFIC) of the electronic device, control the RFIC to set, to a first gain, a gain of at least one first low noise amplifier (LNA) among a plurality of first LNAs included in the electronic device to process a second RF signal received within a first downlink band of the first operating band provided from a radio frequency front end (RFFE) of the electronic device to the RFIC, and based on the first RF signal and a third RF signal within a second uplink band of a second operating band different from the first operating band being concurrently output via the RFIC, control the RFIC to set, to a second gain, the gain of the at least one first LNA configured to process the second RF signal provided from the at least one RFFE to the RFIC, wherein the second gain is less than the first gain.

* * * * *